US012107876B2

(12) United States Patent
Kishikawa et al.

(10) Patent No.: US 12,107,876 B2
(45) Date of Patent: Oct. 1, 2024

(54) INTRUSION PATH ANALYSIS DEVICE AND INTRUSION PATH ANALYSIS METHOD

(71) Applicant: Panasonic Intellectual Property Corporation of America, Torrance, CA (US)

(72) Inventors: Takeshi Kishikawa, Osaka (JP); Ryo Hirano, Osaka (JP); Tomoyuki Haga, Nara (JP); Yoshihiro Ujiie, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 380 days.

(21) Appl. No.: 17/665,218

(22) Filed: Feb. 4, 2022

(65) Prior Publication Data

US 2022/0182404 A1 Jun. 9, 2022

Related U.S. Application Data

(63) Continuation of application No. PCT/JP2020/047528, filed on Dec. 18, 2020.

(30) Foreign Application Priority Data

Jan. 14, 2020 (WO) .................. PCT/JP2020/000921

(51) Int. Cl.
*H04L 9/40* (2022.01)
(52) U.S. Cl.
CPC .......... *H04L 63/1425* (2013.01); *H04L 63/02* (2013.01); *H04L 63/145* (2013.01)
(58) Field of Classification Search
None
See application file for complete search history.

(56) References Cited

U.S. PATENT DOCUMENTS

| 10,419,480 B1* | 9/2019 | Tkach | H04L 63/1416 |
| 11,665,178 B2* | 5/2023 | Gutierrez | G06N 5/01 |
| | | | 726/22 |

(Continued)

FOREIGN PATENT DOCUMENTS

| JP | 6508631 | 5/2019 |
| | (2014/061021 | |
| JP | 2019-125344 | 7/2019 |

(Continued)

OTHER PUBLICATIONS

"IEEE Standard for Local and metropolitan area networks—Media Access Control (MAC) Security", IEEE Std 802.1AE™-2018, Sep. 2018, pp. 1-239.

(Continued)

*Primary Examiner* — Jeffrey R Swearingen
(74) *Attorney, Agent, or Firm* — Greenblum & Bernstein, P.L.C.

(57) ABSTRACT

The control network system is connected to electronic control unit(s) and a communication device, and includes security sensor(s) that transmits a security alert indicating that an indication of a security breach is detected to the network, if the indication is detected in at least one of the network, the electronic control unit(s), or the communication device. The intrusion path analysis device includes: an alert obtainer that obtains the security alert from the security sensor(s); an event obtainer that obtains an event history of an event that occurs in the control network system; and an intrusion path analyzer that performs an analysis on an intrusion path of an attack on the basis of the security alert, the event history, and an intrusion depth indicating an intrusion level to be assumed in a case the security alert occurs, and that outputs a result of the analysis.

15 Claims, 20 Drawing Sheets

(56) References Cited

U.S. PATENT DOCUMENTS

| | | |
|---|---|---|
| 2015/0271201 A1 | 9/2015 | Ruvio et al. |
| 2019/0349394 A1 | 11/2019 | Kishikawa et al. |
| 2020/0304534 A1* | 9/2020 | Rakesh ............... H04L 63/1433 |
| 2021/0237665 A1 | 8/2021 | Tamura et al. |

FOREIGN PATENT DOCUMENTS

| | | |
|---|---|---|
| WO | 2014/061021 | 4/2014 |
| WO | 2019/107210 | 6/2019 |

OTHER PUBLICATIONS

Bellovin, "Guidelines for Specifying the Use of IPsec Version 2", Network Working Group, RFC 5406, BCP 146, Best Current Practice, Feb. 2009, pp. 1-13.

International Search Report issued in International Pat. Appl. No. PCT/JP2020/047528, dated Mar. 9, 2021, along with an English translation thereof.

International Search Report issued in International Pat. Appl. No. PCT/JP2020/000921, dated Mar. 31, 2020, along with an English translation thereof.

\* cited by examiner

FIG. 8

| Time | Depth | Alert No. | Alert ID | Details of alert |
|---|---|---|---|---|
| 11:50:20 | 5 | 10001 | 0001 | Verification failure of message authentication code with ID "100" |

FIG. 9

| Depth | Time | Alert ID or vehicle event | Indicator |
|---|---|---|---|
| 1 | 11:45:10 | 0011 [Port scan detection] | Transmission source address: aaa.bbb.ccc.ddd |
| 2 | — | — | — |
| 3 | 11:47:15 | 0010 [Network IDS alert] | Signature ID: 0x12345 |
| 4 | 11:48:30 | Update completion of application of central ECU | Hash value: 0x56ab78cd90ef |
| 5 | 11:50:20 | 0001 [Verification failure of message authentication code] | CAN ID: 0x100 |
| 6 | — | — | — |
| 7 | — | — | — |
| 8 | — | — | — |

FIG. 10

| Time | Depth | Alert No. | Alert ID | Details of alert |
|---|---|---|---|---|
| 11:45:10 | 1 | 23042 | 0011 | Transmission source address: aaa.bbb.ccc.ddd |
| 11:47:15 | 3 | 5000 | 0010 | Signature ID: 0x12345 |
| 11:50:20 | 5 | 10001 | 0001 | Verification failure of message authentication code with ID "100" |

FIG. 11

| Time | Vehicle event |
|---|---|
| 11:24:00 | Ignition turned ON |
| 11:26:06 | Start of traveling |
| 11:31:35 | Activation of automated driving mode |
| 11:48:30 | Update completion of central ECU |

FIG. 16

| Depth | Security sensor | Location |
|---|---|---|
| 1 | Network IDS (Network 20) | TCU 100 |
| 2 | Host IDS | TCU 100 |
| 3 | Network IDS (Ethernet 11) | Ethernet switch 102 |
| 4 | Host IDS | Central ECU 101 |
| 5 | Verification of message authentication code | Central ECU 101 and ECUs 108, 109, and 110 |
| 6 | Network IDS (Ethernet 12) | Ethernet switch 103 |
| 7 | Host IDS | ECU 107 |
| 8 | Network IDS (CAN 14) | ECU 107 |

FIG. 18

| Depth | Target ECU | Countermeasures |
|---|---|---|
| 1 | | |
| 2 | TCU100 | Strengthening of monitoring function |
| 3 | TCU 100, Ethernet switch 102, ECU 104, ECU 105, and central ECU 101 | Restriction on updating |
| 4 | | |
| 5 | ECU 106, ECU 107, ECU 108, ECU 109, ECU 110, Ethernet switch 103, and central ECU 101 | Strengthening of monitoring function |
| 6 | | |
| 7 | ECU 107 and ECU 111 | Restriction on automated driving function |
| 8 | | |

FIG. 19

| Depth | Time | Alert ID or vehicle event | Indicator | Entry point of attack |
|---|---|---|---|---|
| 1 | 11:45:10 | 0011 [Port scan detection] | Transmission source address: aaa.bbb.ccc.ddd | Entry point |
| 2 | | — | — | — |
| 3 | 11:47:15 | 0010 [Network IDS alert] | Signature ID: 0x12345 | — |
| 4 | 11:48:30 | Update completion of application of central ECU | Hash value: 0x56ab78cd90ef | — |
| 5 | 11:50:20 | 0001 [Verification failure of message authentication code] | CAN ID: 0x10 | — |
| 6 | | — | — | — |
| 7 | | — | — | — |
| 8 | | — | — | — |

FIG. 20

| Threat | Indicator |
|---|---|
| A | Transmission IP address: aaa.bbb.ccc.ddd<br>Hash value of firmware: 0x56ab78cd90ef<br>CAN IDs: 0x100, 0x110, and 0x200 |
| B | Transmission IP address: www.xxx.yyy.zzz<br>Hash value of firmware: 0x1234567890ab<br>CAN IDs: 0x50 and 0x70 |
| C | Transmission IP address: iii.jjj.kkk.lll<br>Ethernet frame: 0xabcdef11223344556677889 |

INTRUSION PATH ANALYSIS DEVICE AND INTRUSION PATH ANALYSIS METHOD

CROSS REFERENCE TO RELATED APPLICATIONS

This is a continuation application of PCT International Application No. PCT/JP2020/047528 filed on Dec. 18, 2020, designating the United States of America, which is based on and claims priority of PCT International Application No. PCT/JP2020/000921 filed on Jan. 14, 2020. The entire disclosures of the above-identified applications, including the specifications, drawings and claims are incorporated herein by reference in their entirety.

FIELD

The present disclosure relates to an intrusion path analysis device and an intrusion path analysis method that analyze an intrusion path of an attack made on a network (such as an in-vehicle network).

BACKGROUND

In recent years, a system installed in a vehicle includes multiple devices called electronic control units (hereinafter, referred to as ECUs). A network connecting these ECUs is called an in-vehicle network. A number of standards have been developed for in-vehicle networks. One of the most leading in-vehicle networks is a controller area network (hereinafter, referred to as a CAN). In anticipation of increased in-vehicle network traffic along with the popularization of automated driving and connected cars, in-vehicle Ethernet networks have become widespread.

On the other hand, it is pointed out that a proliferation of connected cars presents a threat that an attacker may intrude into an in-vehicle network of a vehicle from an external network and perform an unauthorized control over the vehicle. Thus, study of security is underway.

Approaches to enhancing the security of the in-vehicle network have been developed. As disclosed in Non-Patent Literatures (NTLs) 1 and 2, examples of such approaches in conventional Internet Protocol (IP) communications include a method that uses cryptographic communication to prevent an anomalous node from communication and a method that makes domain separation to protect a control network. However, in view of a new possible discovery of vulnerability or a constantly changing environment of the attacker, it is difficult to continue to protect a long life-span of an automobile simply using a security function included with shipment. In response to this, attention is also directed toward an approach that monitors whether a network has any security anomaly and then addresses this anomaly (see Patent Literature [PTL] 1, for example).

CITATION LIST

Patent Literature

PTL 1: Japanese Patent No. 6508631

Non Patent Literature

NPL 1: RFC5406: Guidelines for Specifying the Use of IPsec Version 2
NPL 2: IEEE 802. 1AE: MAC Security

SUMMARY

Technical Problem

Identifying an intrusion path of an attack is useful for analyzing the attack and also for quickly taking a countermeasure afterward. Thus, the intrusion path of the attack is to be identified. Here, the method disclosed in PTL 1 is capable of detecting an attack made on the control network. However, this method is incapable of identifying the intrusion path of the attack.

In response to this issue, the present disclosure provides an intrusion path analysis device and an intrusion path analysis method that output information about an intrusion path of an attack made on a control network.

Solution to Problem

In order to achieve the above-described object, in accordance with an aspect of the present disclosure, an intrusion path analysis device is communicably connected to a control network system via a network, the control network system being connected to at least one electronic control unit and a communication device, the control network system including at least one security sensor, the at least one security sensor transmitting a security alert indicating that an indication of a security breach is detected to the network, if the indication of the security breach is detected in at least one of the network, the at least one electronic control unit, or the communication device, and the intrusion path analysis device includes: an alert obtainer that obtains the security alert from the at least one security sensor; an event obtainer that obtains an event history of an event that occurs in the control network system; and an intrusion path analyzer that performs an analysis on an intrusion path of an attack on the basis of the security alert, the event history, and an intrusion depth indicating an intrusion level to be assumed in a case the security alert occurs, and that outputs a result of the analysis.

In order to achieve the above-described object, in accordance with another aspect of the present disclosure, an intrusion path analysis method is used by a control network system via a network, the control network system being connected to at least one electronic control unit and a communication device, the control network system including at least one security sensor, the at least one security sensor transmitting a security alert indicating that an indication of a security breach is detected to the network, if the indication of the security breach is detected in at least one of the network, the at least one electronic control unit, or the communication device, and the intrusion path analysis method includes: obtaining the security alert from the at least one security sensor; obtaining an event history of an event that occurs in the control network system; and performing an analysis on an intrusion path of an attack on the basis of the security alert, the event history, and an intrusion depth indicating an intrusion level to be assumed in a case the security alert occurs, and outputting a result of the analysis.

Advantageous Effects

An intrusion path analysis device and so forth according to an aspect of the present disclosure are capable of outputting information about an intrusion path of an attack made on a control network.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 8 illustrates an example of a security alert outputted by a security sensor according to Embodiment.

FIG. 9 illustrates an example of history information included in an analysis report generated by the central ECU, according to Embodiment.

FIG. 10 illustrates an example of a security alert history stored in a security alert history holder, according to Embodiment.

FIG. 11 illustrates an example of a vehicle event history stored in a vehicle event history holder, according to Embodiment.

FIG. 16 illustrates an example of a database on locations of security sensors, according to a variation of Embodiment.

FIG. 18 illustrates an example of a relationship between a target ECU to which a caution is to be issued and a countermeasure taken by this ECU, in association with a depth of a security alert, according to another variation of Embodiment.

FIG. 19 illustrates an example of an analysis report according to another variation of Embodiment.

FIG. 20 illustrates an example of a threat database held by a central ECU according to another variation of Embodiment.

Figure 1:
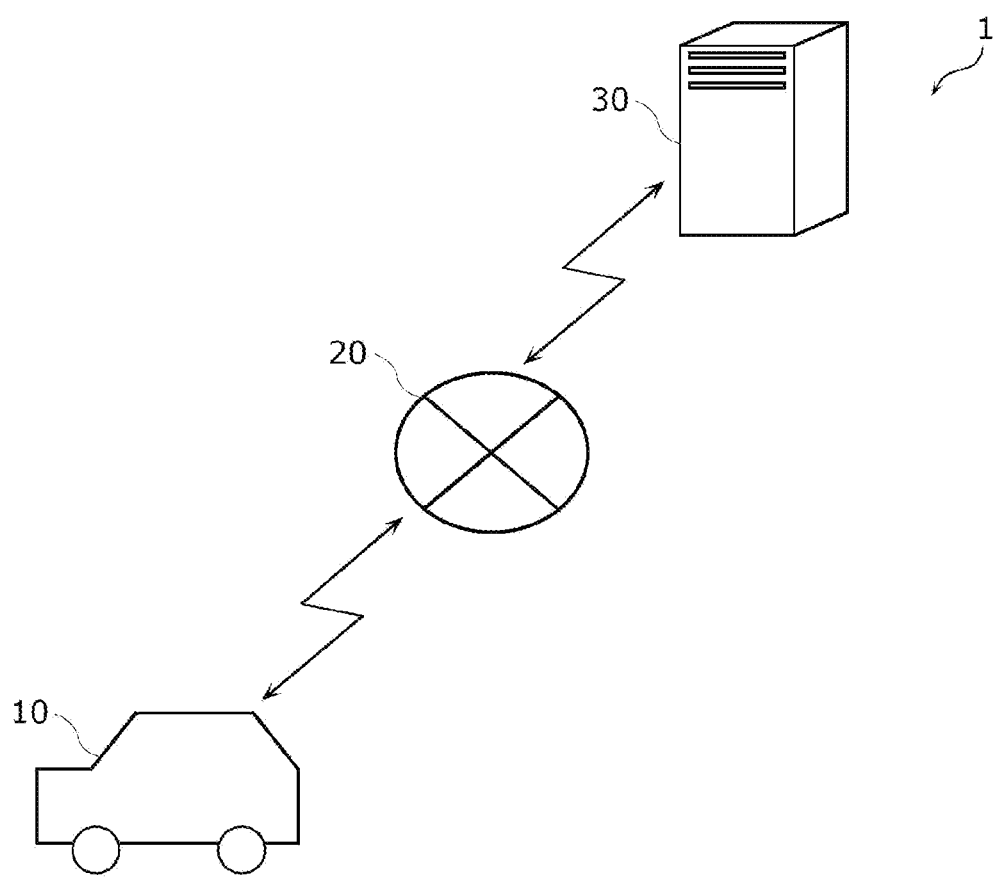
FIG. 1 illustrates an overall configuration of an in-vehicle network monitoring system according to Embodiment.

DESCRIPTION OF EMBODIMENTS (Underlying Knowledge Forming Basis of the Present Disclosure)

The following describes an in-vehicle network as an example of a network.

As described in the Technical Problem section, identifying an intrusion path of an attack (such as a cyberattack) is useful for analyzing the attack and also for quickly taking a countermeasure afterward. For example, identifying what kind of entry point (a point that is first under attack) is first attacked or what kind of intrusion path is taken by the attack is useful for analyzing the attack.

To maintain the security of the vehicle after the detection of the attack, it is important to analyze a cause of the attack and localize and fix vulnerability. For the analysis of the attack, information that allows a security analyst to easily identify the cause of the attack is to be presented. The information indicating the intrusion path is useful in this regard as well.

For the above reasons, the intrusion path of the attack is to be identified. However, the technologies disclosed in the related art documents are incapable of identifying the intrusion path of the attack.

As a result of diligent efforts in response to this issue, the inventors invent an intrusion path analysis device and so forth that are capable of identifying an intrusion path of an attack as described below.

In accordance with an aspect of the present disclosure, an intrusion path analysis device is communicably connected to a control network system via a network, the control network system being connected to at least one electronic control unit and a communication device, the control network system including at least one security sensor, the at least one security sensor transmitting a security alert indicating that an indication of a security breach is detected to the network, if the indication of the security breach is detected in at least one of the network, the at least one electronic control unit, or the communication device, and the intrusion path analysis device includes: an alert obtainer that obtains the security alert from the at least one security sensor; an event obtainer that obtains an event history of an event that occurs in the control network system; and an intrusion path analyzer that performs an analysis on an intrusion path of an attack on the basis of the security alert, the event history, and an intrusion depth indicating an intrusion level to be assumed in a case the security alert occurs, and that outputs a result of the analysis.

Thus, the intrusion path analysis device is capable of analyzing the intrusion path of the attack made on the control network, on the basis of the security alert, the event history, and the intrusion depth. The use of the event history also enables the analysis of the intrusion path in light of a relationship between the event that is normally completed and the intrusion depth of the security alert, for example. This allows the intrusion path analysis device to analyze the intrusion path more accurately as compared to the case where the event history is not used. Hence, the intrusion path analysis device is capable of outputting the result of the analysis that includes information about the intrusion path of the attack made on the control network.

For example, the result of the analysis allows the security analyst, who performs the analysis on the attack, to obtain the result of analyzing the path of the intrusion made into the control network. Thus, a countermeasure against the attack and a next location to be attacked are easily assumed. This is effective in responding to the attack.

For example, it is possible that the control network system includes at least two subnetworks, the communication device is included in at least one of the at least two subnetworks and communicates with one of a network located outside the control network system and a device, and the intrusion depth is set according to at least one of a total physical number of intermediate points or a total logical number of intermediate points between the communication device and a monitoring target of the security sensor, the intermediate points including at least one among the at least one electronic control unit, the at least two subnetworks, and a gateway device that connects the at least two subnetworks.

Thus, a greater intrusion depth is set for a security alert outputted from a security sensor located in an area that is difficult for an external attacker to reach. On this account, the result of the analysis may further reflect the intrusion situation of the attack. Hence, the intrusion path analysis device is capable of outputting the result of the analysis that allows easy grasping of the intrusion situation of the attack. This is effective in analyzing the attack.

For example, it is also possible that if the security alert includes a plurality of security alerts, the intrusion path analyzer performs the analysis by determining whether the event is caused by the attack on the basis of a temporal change in intrusion depths of the plurality of security alerts and the event that occurs while the plurality of security alerts are detected.

In this case, the result of the analysis includes information indicating whether the event is caused by the attack. This enables the analysis of the attack in light of the event. The use of such a result of the analysis enhances the accuracy of the attack analysis.

For example, it is further possible that the intrusion path analyzer performs the analysis by determining that the event is caused by the attack if an occurrence distribution of the intrusion depth changes around an occurrence time of the event included in the event history.

This enables the intrusion path analysis device to determine whether even the event that is normally completed is caused by the attack, on the basis of an occurrence situation of the security alert. Thus, anomalous operation that cannot be detected by the security sensor can be detected. Hence, the intrusion path analysis device is capable of outputting the result of the analysis that includes the result of detecting the anomalous operation that cannot be detected by the security sensor. This is further effective in analyzing the attack.

For example, it is still further possible that the intrusion path analyzer performs the analysis by determining that an intrusion situation is spreading if the intrusion depth of the security alert increases over time, by determining that the intrusion situation is caused by the attack from an anomalous device if the intrusion depth of the security alert decreases over time, and by determining that the intrusion situation remains same if the intrusion depth of the security alert does not change over time.

Thus, the intrusion path analysis device is capable of determining the current intrusion situation on the basis of the change in the intrusion depths of the plurality of security alerts. The intrusion path analysis device outputs the result of the analysis that includes the result of the determination. This allows the security analyst to grasp the current intrusion situation. Hence, the intrusion path analysis device is capable of outputting information useful for examining a countermeasure against the attack.

For example, it is still further possible that the intrusion path analyzer performs the analysis by determining that an entry point of the attack is an area corresponding to a smallest depth if the intrusion situation is spreading, by determining that the entry point of the attack is an area corresponding to a greatest depth if the intrusion situation is caused by the attack from the anomalous device, and by determining that the entry point of the attack is an area corresponding to a constant depth if the intrusion situation remains the same.

Thus, the intrusion path analysis device is capable of determining the entry point of the attack. The intrusion path analysis device outputs the result of the analysis that includes the entry point. This allows the security analyst to identify the current entry point. Hence, the intrusion path analysis device is capable of outputting information useful for examining a countermeasure against the attack.

For example, it is still further possible that if the security alert is only one and the intrusion depth of the security alert is greater than a predetermined threshold value, the intrusion path analyzer performs the analysis by determining that the security alert is caused by one of false detection and an intrusion by physical access.

Thus, even if only one security alert occurs, the intrusion path analysis device is capable of making the determination related to the analysis of the intrusion path. The intrusion path analysis device outputs the result of the analysis that includes the result of the determination. This allows the security analyst to grasp the current intrusion situation. Hence, the intrusion path analysis device is capable of outputting information useful for examining a countermeasure against the attack.

For example, it is still further possible that if the event relates to the security alert, the intrusion path analyzer performs the analysis by determining that the event is caused by the attack.

Thus, even if only one security alert occurs, the intrusion path analysis device is capable of determining whether the event is caused by the attack. The intrusion path analysis device is capable of outputting the result of the analysis that includes the result of detecting anomalous operation that cannot be detected by the security sensor. This is further effective in analyzing the attack.

For example, it is still further possible that depending on the intrusion depth of the security alert, the intrusion path analyzer executes at least one of: strengthening of a function of monitoring at least one of the at least one electronic control unit or the communication device; or restriction on a function of at least one of the at least one electronic control unit or the communication device.

This enables the intrusion path analysis device to take a countermeasure corresponding to the intrusion depth to reduce the impact of the attack. Hence, the safety of the control network system can be enhanced.

For example, it is still further possible that if it is determined that the intrusion situation is spreading and that the greatest depth among the depths of the plurality of security alerts detected is greater than or equal to the predetermined threshold value, the intrusion path analyzer outputs a notification for partially disabling a function of the control network system.

This enables the intrusion path analysis device to reduce the impact of the attack if the intrusion spreads. Hence, the safety of the control network system can be enhanced.

For example, it is still further possible that the result of the analysis includes at least one of the entry point of the attack, the intrusion depth of the attack, or history information including the event history and the security alert that comprises at least one security alert.

Thus, the intrusion path analysis device allows the security analyst to know the entry point of the attack, the intrusion depth of the attack, and at least one piece of history information. The intrusion path analysis device allows the security analyst to analyze the attack using the at least one piece of information. Hence, the analysis of the attack can be performed effectively.

For example, it is still further possible that the event includes at least one of: a login to a device included in the in-vehicle network; completion of installation or update of an application or firmware that is included or to be installed in the device; completion of transfer of the firmware; a system diagnosis; or transmission of a failure code.

Thus, the intrusion path analysis device is capable of determining whether at least one of the events is caused by the attack. The event is selected as appropriate depending on an intended use of the control system network. Hence, the intrusion path analysis device is capable of outputting the result of the analysis appropriate to this intended use.

For example, it is still further possible that the security sensor includes at least one of: a network intrusion detection system that detects an indication of an intrusion on the basis of network traffic; a host intrusion detection system that detects an indication of an intrusion on the basis of anomalous operation of the at least one electronic control unit; an anomalous packet detection system of a firewall included in the control network system; a sensor that detects a login failure; a sensor that detects a signature verification failure; a sensor that detects a verification failure of a message authentication code included in a message transmitted on the network; or a sensor that detects a security access failure.

Thus, the different kinds of security sensors of the intrusion path analysis device are capable of detecting indications of the intrusion made by the attack. This enhances the accuracy of the analysis report that is to be generated.

For example, it is still further possible that the control network system is an in-vehicle network system.

This enables the intrusion path analysis device to analyze the path of the intrusion made into the in-vehicle network system. This is effective in taking a countermeasure against the attack made on the in-vehicle network system. For example, vehicle travel safety is enhanced.

In order to achieve the above-described object, in accordance with another aspect of the present disclosure, an intrusion path analysis method is used by a control network system via a network, the control network system being connected to at least one electronic control unit and a communication device, the control network system including at least one security sensor, the at least one security sensor transmitting a security alert indicating that an indication of a security breach is detected to the network, if the indication of the security breach is detected in at least one of the network, the at least one electronic control unit, or the communication device, and the intrusion path analysis method includes: obtaining the security alert from the at least one security sensor; obtaining an event history of an event that occurs in the control network system; and performing an analysis on an intrusion path of an attack on the basis of the security alert, the event history, and an intrusion depth indicating an intrusion level to be assumed in a case the security alert occurs, and outputting a result of the analysis.

This method achieves the same advantageous effects as the intrusion path analysis device described above.

General or specific aspects of the present disclosure may be implemented to a system, a method, an integrated circuit, a computer program, a computer-readable recording medium such as a Compact Disc-Read Only Memory (CD-ROM), or any given combination thereof.

Hereinafter, the intrusion path analysis device according to the aspects of the present disclosure will be described in detail with reference to the drawings. The following embodiments are specific examples of the present disclosure. The numerical values, shapes, materials, elements, arrangement and connection configuration of the elements, steps, and order of the steps, etc., described in the following embodiments are merely examples, and are not intended to limit the present disclosure. Among elements in the following embodiments, those not described in any one of the independent claims indicating the broadest concept of the present disclosure are described as optional elements.

Embodiment 1

Embodiment

The following describes an intrusion path analysis device included in a vehicle installed with an in-vehicle network (in-vehicle network system 10*a*) on which a plurality of electronic control units (ECUs) communicate with each other via a CAN bus and Ethernet (registered trademark). In-vehicle network system 10*a* is an example of a control network system that is a target of intrusion path analysis performed by the intrusion path analysis device.

[1.1 Overall Configuration of In-Vehicle Network Monitoring System 1]

FIG. 1 illustrates an overall configuration of in-vehicle network monitoring system 1 according to Embodiment. In-vehicle network monitoring system 1 includes vehicle 10, network 20, and server 30. Vehicle 10 analyzes a security alert occurring inside the vehicle, generates an analysis report, and notifies server 30 of this analysis report via network 20 (hereinafter, "to notify" is also expressed as "to transmit", such as "to transmit this analysis report to server 30"). Network 20 may include the Internet or a dedicated line. Server 30 receives the report from vehicle 10, and presents a security state (an intrusion situation) of vehicle 10 to, for example, a security analyst on the basis of the analysis report.

[1.2 Network Configuration of Vehicle 10]

Figure 2:
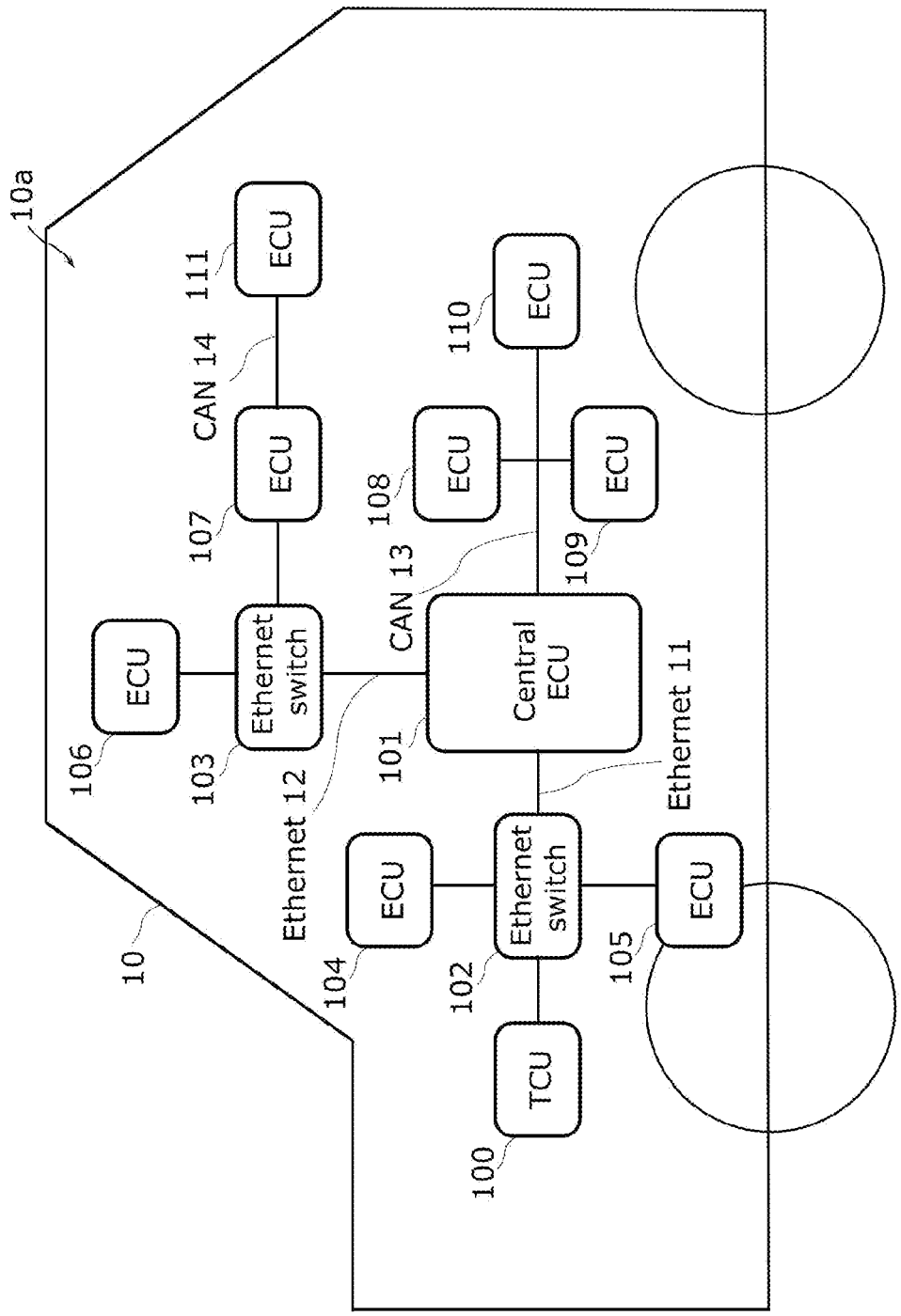
FIG. 2 illustrates a configuration of an in-vehicle network installed in a vehicle according to Embodiment.

FIG. 2 illustrates a configuration of in-vehicle network system 10*a* installed in vehicle 10 according to Embodiment. In-vehicle network system 10*a* includes telematics control unit (TCU) 100, central ECU 101, Ethernet switches 102, and 103, ECUs 104 to 111 (also described as "ECU 104 etc."). In-vehicle network system 10*a* also includes Ethernets (registered trademark [this mention is to be omitted hereafter]) 11 and 12 and CANs 13 and 14 that enable communication among the devices. These devices include security sensors (such as security sensor 1004, 1005, 1104, 1202, and 1303 described later [also described as "security sensor 1004 etc."]). Each of the security sensors transmits a security alert. The security alert is transmitted to central ECU 101 via the network connected to the current device. For example, in-vehicle network system 10*a* includes a subnetwork, described later, that includes at least one security sensor in at least one of ECU 104 etc. or TCU 100 to detect an indication of a security breach. If detecting the indication of the security breach, the security sensor may transmit, to the subnetwork, the security alert indicating that the indication of the security breach is detected. Examples of the indication of the security breach include an operation (such as a verification failure) and information (such as a transmission source IP address or a signature ID) that exhibit a possibility of suffering from an attack. The indication is predetermined.

Central ECU 101 compiles security alerts received from the devices, and analyzes the security alerts to generate an analysis report. Although not illustrated in FIG. 2, the in-vehicle network may include more ECUs. The ECU is a device that includes a processor (a microprocessor), a digital circuit like a memory, an analog circuit, and a communication circuit, for example. The memory is a ROM and a RAM, and is capable of storing a control program (a computer program) to be executed by the processor. For example, the processor operates according to the control program, so that the ECU achieves various functions. The computer program includes a plurality of instruction codes to be issued to the processor to achieve a predetermined function.

Ethernet 11 enables communication among TCU 100, central ECU 101, ECU 104, and ECU 105 via Ethernet switch 102.

Ethernet 12 enables communication among central ECU 101, ECU 106, and ECU 107 via Ethernet switch 103.

CAN 13 enables communication among central ECU 101, ECU 108, ECU 109, and ECU 110.

CAN 14 enables communication between ECU 107 and ECU 111.

Ethernets 11 and 12 and CANs 13 and 14 are examples of subnetworks. Each of the subnetworks is communicably connected to at least one among at least one ECU and at least one TCU 100. The number of subnetworks included in in-vehicle network system 10a is not particularly intended to be limiting. The number of subnetworks may be at least one, and may be at least two for example. More specifically, in-vehicle network system 10a may include at least one subnetwork, and may include at least two subnetworks for example. Note that the at least two subnetworks are communicably connected to each other (communicably connected to each other by wire for example).

TCU 100 includes a communication interface to communicate with a device or a network that is located outside in-vehicle network monitoring system 1 (such as network 20 outside the vehicle). TCU 100 has a function of transmitting, to server 30 via network 20, the analysis report transmitted from central ECU 101. TCU 100 is placed on at least one subnetwork among the at least one subnetwork. TCU 100 is an example of a communication device. The communication interface is an example of an externally-connected interface.

Central ECU 101 has a central role in vehicle 10. Central ECU 101 performs various applications to implement functions of vehicle 10. Moreover, central ECU 101 functions as a gateway of Ethernet 11, Ethernet 12, and CAN 13. Central ECU 101 compiles security alerts received from the security sensors included in vehicle 10, and analyzes the security alerts. After the analysis, central ECU 101 generates an analysis report about an attack occurrence situation inside vehicle 10 or about an intrusion path for example. Then, central ECU 101 transmits the analysis report to TCU 100. Note that the analysis report may include information that allows the intrusion path of the attack to be identified.

To enable communication between devices, Ethernet switch 102 receives a frame transmitted from a device connected to Ethernet 11 and transfers the frame to an appropriate port on the basis of content of the frame. Similarly, Ethernet switch 103 performs frame transfer between the devices connected to Ethernet 12.

ECUs 104 to 111 perform control related to running of vehicle 10 for example, through transmission of sensor information of vehicle 10 and control over an actuator of vehicle 10. For example, ECU 104 and ECU 105 connected to Ethernet 11 are infotainment system ECUs that exchange image and audio data for instance. CAN 13 is a body system network. ECUs 108, 109, and 110 connected to CAN 13 control body system parts, such as a door, a window, and a seat. Ethernet 12 is a network on which sensor information of a camera and a radar located outside the vehicle is exchanged. For example, ECU 106 includes a radar ECU and a camera ECU. ECU 107 receives the sensor information and implements automated driving or a driving assistance function. CAN 14 is a network on which powertrain-system information and chassis-system information of vehicle 10 is communicated. For example, control information from ECU 107 may be communicated on CAN 14. CAN 111 is a steering ECU or an engine ECU, for instance.

[1.3 Configuration of TCU 100]

Figure 3:
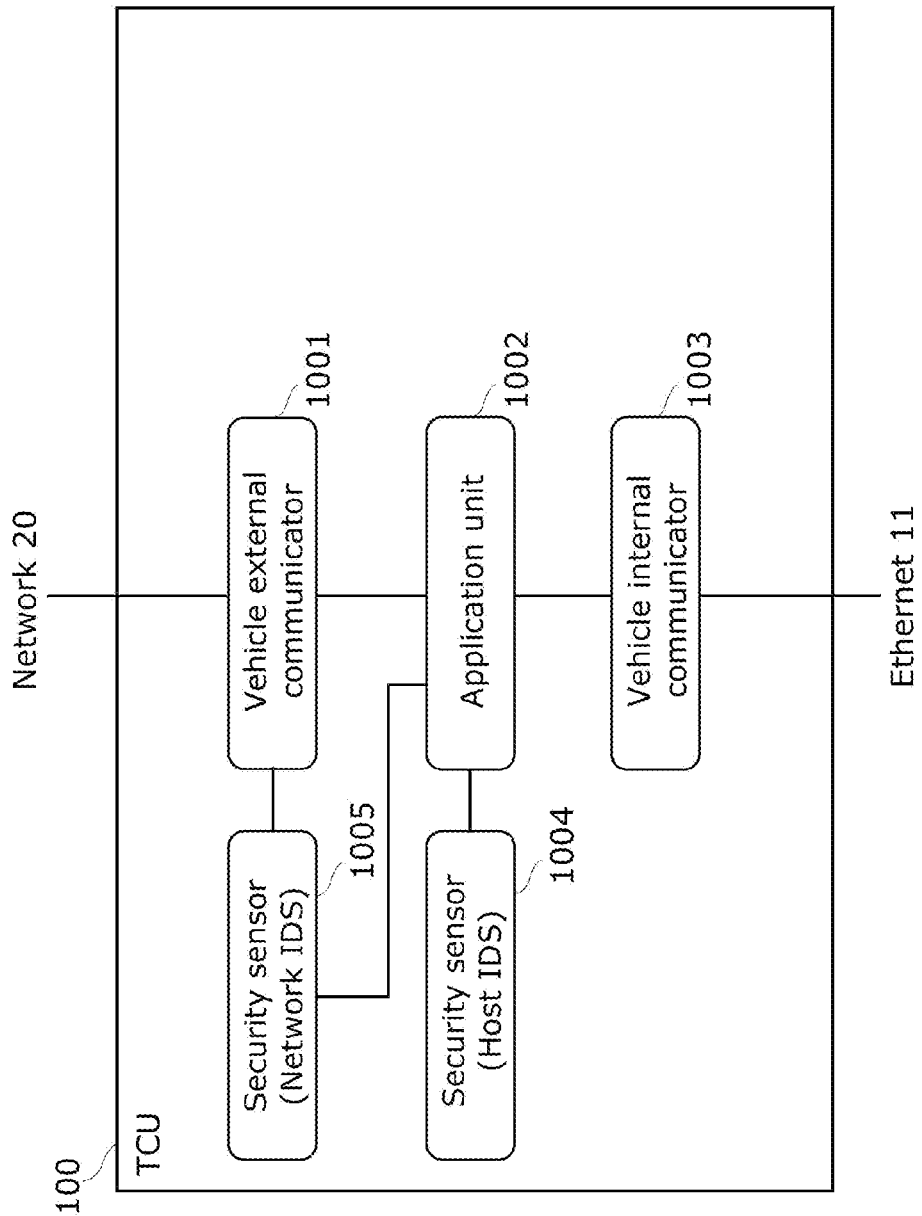
FIG. 3 illustrates a configuration of a TCU according to Embodiment.

FIG. 3 illustrates a configuration of TCU 100 according to Embodiment. TCU 100 includes vehicle external communicator 1001, application unit 1002, vehicle internal communicator 1003, and security sensors 1004 and 1005.

Vehicle external communicator 1001 is a communication interface for wireless communication performed via network 20. Vehicle external communicator 1001 communicates with server 30, and transmits and receives information to and from application unit 1002. Moreover, vehicle external communicator 1001 also transmits communication details to security sensor 1005 that monitors communication of a vehicle external network.

Application unit 1002 runs an application for notifying server 30 of information about the in-vehicle network or an application for transmitting data to the in-vehicle network on the basis of date received from network 20. Application unit 1002 may run a plurality of applications.

Vehicle internal communicator 1003 is connected to Ethernet 11, and transmits a received frame to application unit 1002.

Security sensor 1004 is a host intrusion detection system (host IDS) and monitors, on the basis of operation of application unit 1002, whether an application causes anomalous operation. The host IDS monitors a CPU of the application, a resource usage rate of a memory, communication traffic, a communication destination, or an access authority, for example, to determine whether a reference value is satisfied. To provide notification of a security alert in the case of anomalous operation, security sensor 1004 requests application unit 1002 to transmit the security alert. A target to be monitored by security sensor 1004 is application unit 1002, for example.

Security sensor 1005 is a network IDS and monitors, on the basis of the frame transmitted from vehicle external communicator 1001, whether anomalous communication is performed. For example, the network IDS detects an anomaly in packet communication volume, verifies an unidentified communication destination, and detects a port scan. To provide notification of a security alert in the case of anomalous communication, security sensor 1005 requests application unit 1002 to transmit the security alert. Targets to be monitored by security sensor 1005 are vehicle external communicator 1001 and application unit 1002. Thus, information transmitted and received, such as a frame, is to be monitored.

[1.4 Configuration of Central ECU 101]

Figure 4:
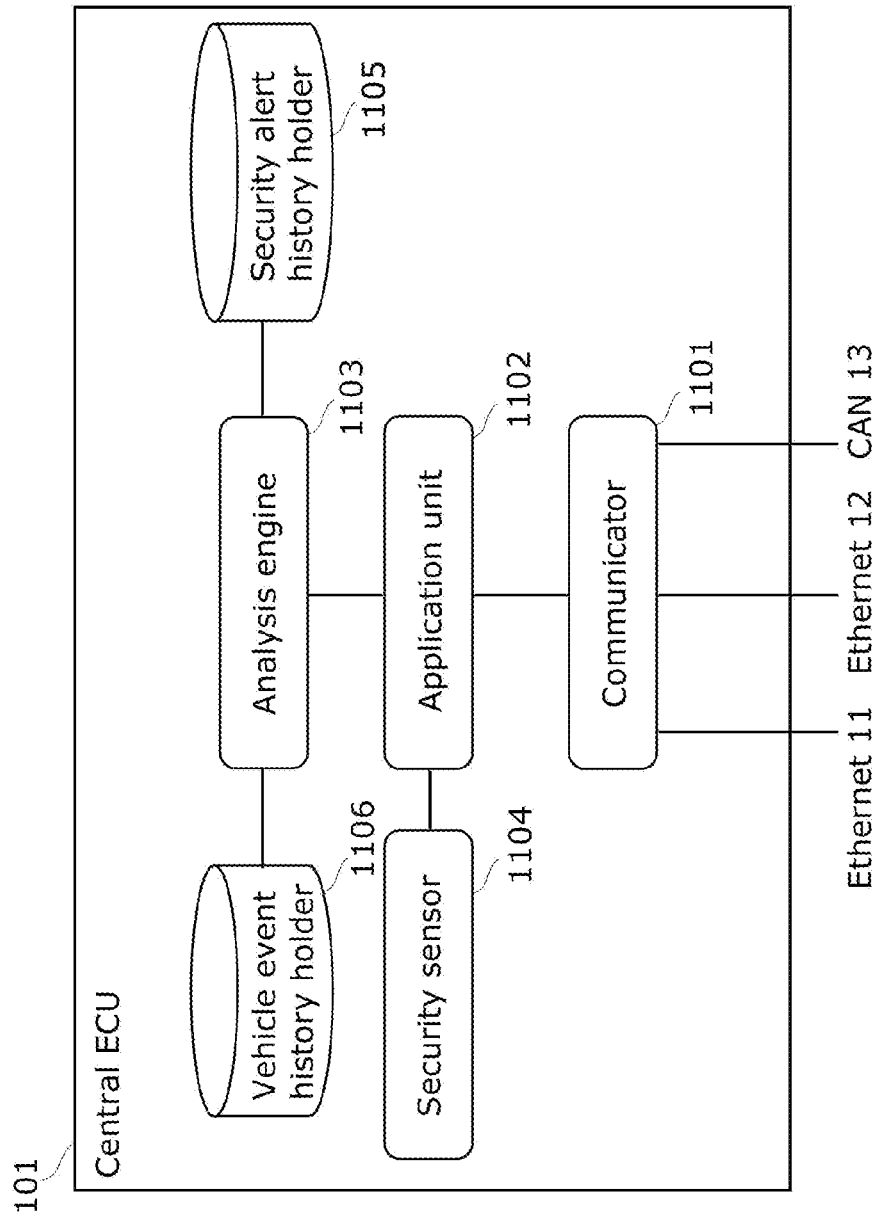
FIG. 4 illustrates a configuration of a central ECU according to Embodiment.

FIG. 4 illustrates a configuration of central ECU 101 according to Embodiment. Central ECU 101 includes communicator 1101, application unit 1102, analysis engine 1103, security sensor 1104, security alert history holder 1105, and vehicle event history holder 1106. Note that central ECU 101 functions as an intrusion path analysis device.

Communicator 1101 is a communication interface for communication performed via Ethernet 11, Ethernet 12, and CAN 13. Communicator 1101 has a function of transferring the received information to an appropriate network (subnetwork) on the basis of communication details. Moreover, communicator 1101 transmits and receives information to and from application unit 1102. Communicator 1101 functions as an alert obtainer that obtains a security alert from the security sensor.

If receiving a security alert, application unit 1102 starts a monitoring application to notify analysis engine 1103 of the security alert. Thus, application unit 1102 transmits (outputs) the security alert to analysis engine 1103. Moreover, application unit 1102 extracts a vehicle event and notifies analysis engine 1103 of the extracted vehicle event. For example, vehicle events of ECU 104 etc. may be obtained via communicator 1101 from application units included in ECU 104 etc. The vehicle events are described later. Note that the vehicle event is an example of an event.

Analysis engine 1103 analyzes an intrusion path of an attack on the basis of the security alert, a vehicle event history (an example of an event history), and a depth indicating an intrusion level of the attack that is assumed in the case of the security alert. Then, analysis engine 1103 outputs an analysis report. For example, analysis engine 1103 may analyze the intrusion path on the basis of the security alert, generate the analysis report, and transmit the analysis report to application unit 1102. Analysis engine 1103 is an example of an intrusion path analyzer. The analysis report is an example of a result of analysis.

Analysis engine 1103 collects the security alert received from the in-vehicle network and stores the security alert into security alert history holder 1105. Moreover, analysis engine 1103 receives information related to a vehicle event from application unit 1102 and stores the received information into vehicle event history holder 1106.

Security sensor 1104 is a host IDS that monitors operation of an application of central ECU 101 or a network IDS that monitors details of communication performed on the in-vehicle network. If detecting anomalous operation or anomalous communication, security sensor 1104 transmits a security alert to application unit 1102.

Security alert history holder 1105 holds (accumulates) security alerts received before. The history of security alerts held by security alert history holder 1105 (see FIG. 10 described later, for example) is described later.

Vehicle event history holder 1106 holds (accumulates) a history of vehicle events received from application unit 1102. The history of vehicle events held by vehicle event history holder 1106 (see FIG. 11 described later, for example) is described later.

[1.5 Configuration of Ethernet Switch 102]

Figure 5:
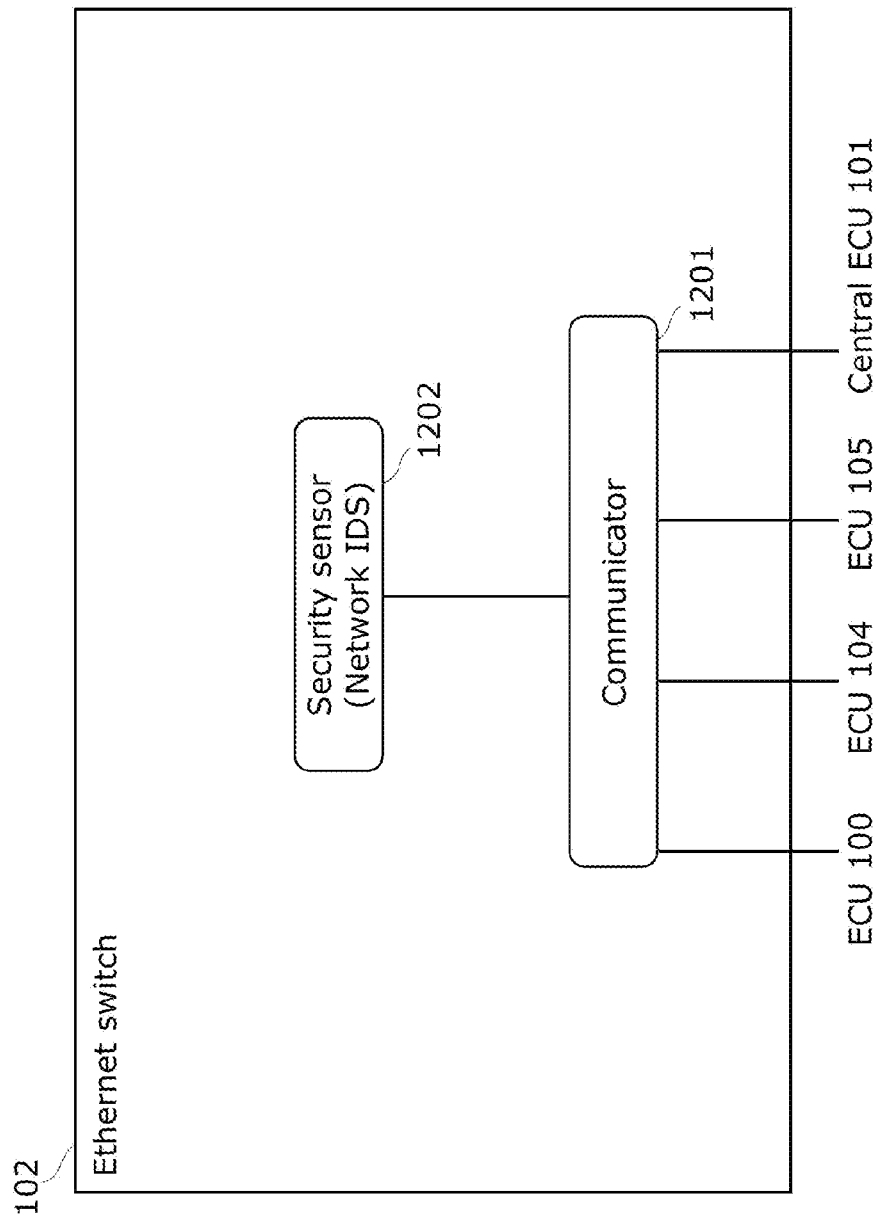
FIG. 5 illustrates a configuration of an Ethernet switch according to Embodiment.

FIG. 5 illustrates a configuration of Ethernet switch 102 according to Embodiment. Here, Ethernet switch 103 has the same configuration as Ethernet switch 102 and thus description on Ethernet switch 103 is omitted.

Ethernet switch 102 includes communicator 1201 and security sensor 1202.

Communicator 1201 includes four physical ports connected to TCU 100, ECU 104, ECU 105, and central ECU 110 on a one-to-one basis. Communicator 1201 performs frame transfer on the basis of content of the received frame. To monitor the received frame, communicator 1201 transmits the frame to security sensor 1202.

Security sensor 1202 is a network IDS that monitors the frame transmitted from communicator 1201 and verifies whether anomalous communication is performed. If determining that anomalous communication is performed, security sensor 1202 generates a security alert and requests communicator 1201 to transmit the security alert.

[1.6 Configuration of ECU 104]

Figure 6:
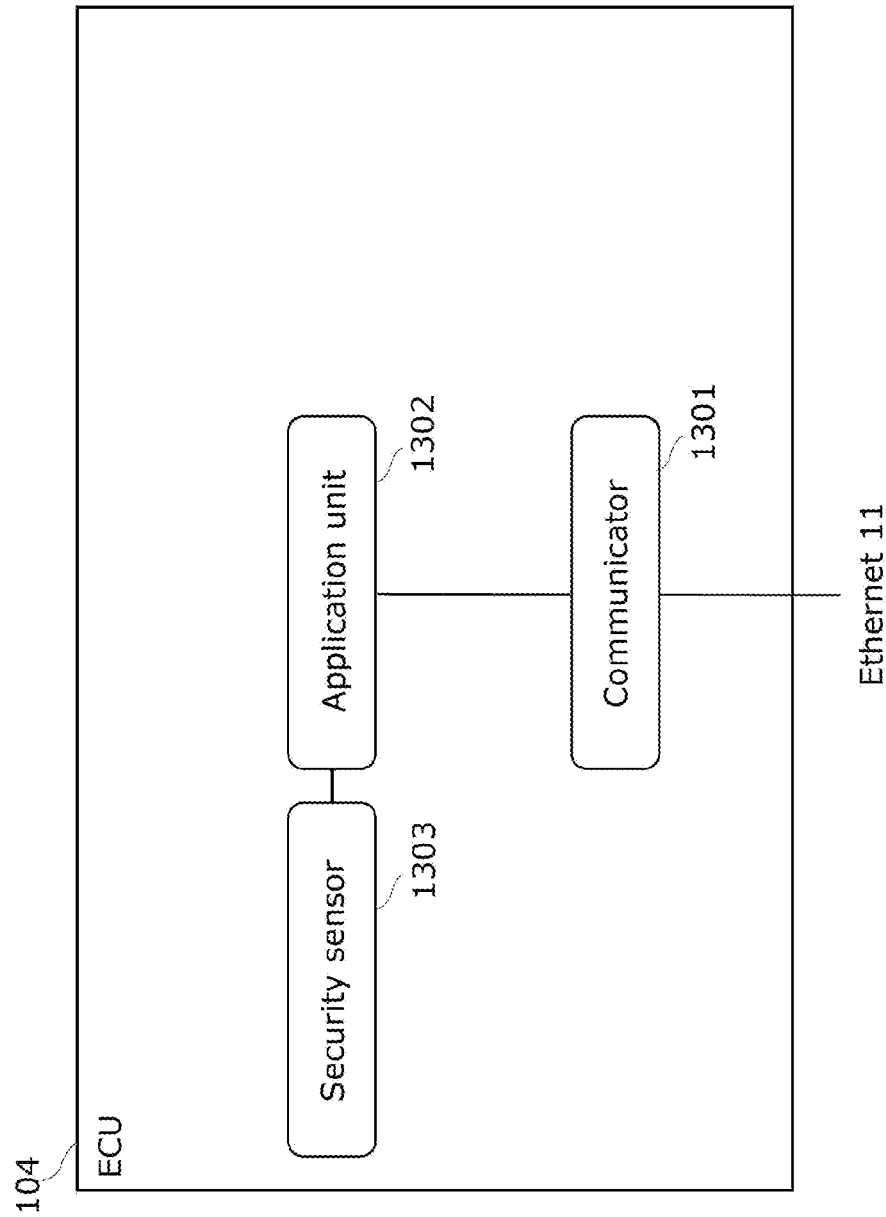
FIG. 6 illustrates a configuration of an ECU according to Embodiment.

FIG. 6 illustrates a configuration of ECU 104 according to Embodiment. Each of ECUs 105 to 111 has the same configuration as ECU 104 and thus description on these ECUs is omitted.

ECU 104 includes communicator 1301, application unit 1302, and security sensor 1303.

Communicator 1301 is a communication interface that is connected to Ethernet 11 and transmits and receives frames.

Application unit 1302 reads a sensor value from a sensor connected to ECU 104 and executes an application to control the actuator for example.

Security sensor 1303 is a host IDS that monitors operation of application unit 1302. Security sensor 1303 detects an event related to security, such as an access error of a diagnostic command or a verification failure of a message authentication code included in the frame. If detecting an anomalous event related to security, security sensor 1303 generates a security alert and requests communicator 1301 to transmit the security alert.

[1.7 Configuration of Server 30]

Figure 7:
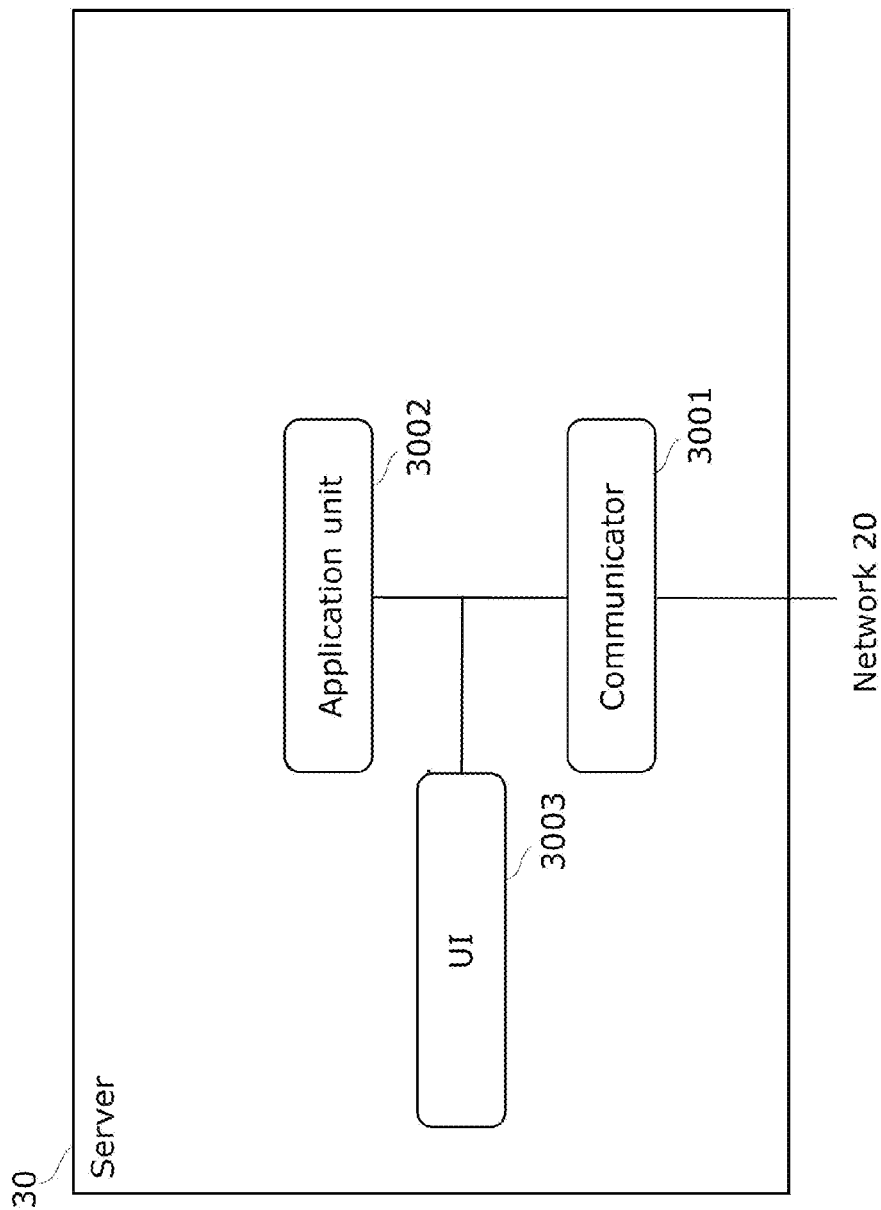
FIG. 7 illustrates a configuration of a server according to Embodiment.

FIG. 7 illustrates a configuration of server 30 according to Embodiment. Server 30 includes communicator 3001, application unit 3002, and user interface (UI) 3003.

Communicator 3001 is a communication interface for wireless communication performed via network 20. Communicator 3001 receives the analysis report transmitted from vehicle 10 and transmits the analysis report to application unit 3002.

Application unit 3002 is an application that performs a secondary analysis on the received analysis report.

UI 3003 presents the received analysis report to the security analyst. On the basis of the analysis report presented, the security analyst verifies the attack made on vehicle 10 and determines a countermeasure. For example, UI 3003 is implemented by a display device or an audio output device. However, this is not intended to be limiting.

[1.8 Example of Security Alert]

FIG. 8 illustrates an example of a security alert outputted by security sensor 1004 etc. according to Embodiment. The security alert includes at least one field corresponding to at least one of: a time at which the security alert occurs; a location where the security alert occurs; or a depth determined on the basis of a monitoring target of the security sensor. Moreover, the security alert includes fields corresponding to: an alert No. indicating a serial number of the alert; an alert ID for identifying a type of the alert; and detailed information on the alert. FIG. 8 illustrates an example of the security alert that includes the depth determined on the basis of the monitoring target of the security sensor, out of the location where the security alert occurs and the depth determined on the basis of the monitoring target of the security sensor.

The example in FIG. 8 illustrates that the security alert occurs at "11:50:20", that the depth is "5", that the alert No. is "10001", that the alert ID is "0001", and that "verification failure of message authentication code with ID "100"" is described as the details of the alert.

If the monitoring target of the security sensor is a vehicle external network, the depth is set at 1. If the monitoring target is a first device that includes an externally-connected device interface, the depth is set at 2. Examples of the externally-connected device interface include a universal serial bus (USB) port, an on-board diagnostics (OBD) 2 port, and Bluetooth (registered trademark [this mention is to be omitted hereafter]). If the monitoring target is a first vehicle internal network connected to the first device, the depth is set at 3. If the monitoring target is a second device connected to a first vehicle internal network of a device other than the first device, the depth is set at 4. If the monitoring target is a second vehicle internal network different from the first vehicle internal network and connected to the second device, the depth is set at 5. In this way, the value representing the depth increases with an increase in the number of devices or networks via which access is made from an external network or an externally-connected device.

For example, the depth for TCU 100 illustrated in FIG. 2 may be set at 1, and the depth for Ethernet switch 102 may be set greater than the depth for TCU 100 (at 2 for example). The depth for central ECU 101 may be set greater than the depth for Ethernet switch 102 (at 3 for example). The depth for Ethernet switch 103 may be set greater than the depth for central ECU 101 (at 4 for example). The depth for ECUs 106 and 107 may be set greater than the depth for Ethernet switch 103 (at 5 for example). In this way, the depth may be set for each of the devices. ECUs 106 and 107 have the same number of the intermediate devices from TCU 100. In such a case, the depth for these ECUs may be set at the same value. The depth may be predetermined, and each of the security sensors may store information about the depth. The depth is an example of an intrusion depth.

Note that the depth for the monitoring target may be set according to at least one of a physical number of intermediate points or a logical number of intermediate points between the externally-connected device (such as TCU 100) assumed to be first attacked and the monitoring target of the security sensor (the device to be monitored, for example). The intermediate points include at least one among ECU 104 etc., the subnetworks, and the gateway device connecting the subnetworks together (that is, central ECU 101 in Embodiment). In Embodiment, the depth for the monitoring target is set to increase with an increase in the number of physical intermediate devices or networks. Here, the depth may be set according to only the number of logical intermediate points instead of the number of physical intermediate points, out of the number of physical intermediate points and the number of logical intermediate points.

For example, if the in-vehicle network is a virtual network that includes devices or networks physically adjacent to each other but logically separated, the depth may be set on the assumption that these devices or networks are not intermediate points. Moreover, the depth may not be set according to the number of intermediate points itself between the externally-connected device and the monitoring target. For example, the depth may be set according to a security strength of the monitoring target or a risk of the monitoring target if attacked. The depth may be set greater for the monitoring target that is harder for the attacker to access or that is to be at a serious security risk if attacked. Here, a greater depth indicates that the attack has proceeded more inside in-vehicle network system 10*a*.

The occurrence time of the security alert may be based on a timer counting from when an ignition of the vehicle is turned on. The security alert may be encrypted when transmitted and may include a message authentication code.

[1.9 Example of Analysis Report]

FIG. 9 illustrates an example of history information included in an analysis report generated by central ECU 101, according to Embodiment. For each depth, the history information includes: a time at which a security alert or a vehicle event occurs; an alert ID or vehicle event; and an indicator that indicates details of the attack. The history information according to Embodiment further includes a vehicle event history in addition to a security alert history. Note that a vehicle event may not be included in the history information.

FIG. 9 illustrates that a security alert having depth "1" and alert ID "0011" (port scan detection) occurs at "11:45:10" and that a transmission IP address as an indicator of the attack is "aaa.bbb.ccc.ddd". For depth "2", no security alert nor vehicle event is detected. Then, a security alert having depth "3" and alert ID "0010" (network IDS alert) occurs at "11:47:15". An indicator of the attack indicates that a signature ID of the network IDS matches "0x12345". Moreover, a vehicle event having depth "4" and updating one application of central ECU 101 takes place at "11:48:30". An indicator is a hash value of the application, which is "0x56ab78cd90ef". Furthermore, a security alert having depth "5" and alert ID "0001" (verification failure of message authentication code) occurs at "11:50:20". An indicator indicates that a CAN ID is "0x100". This diagram also illustrates that no security alert nor vehicle event corresponding to depths "6" to "8" is detected.

For example, central ECU 101 may read at least one security alert (security alert history) from security alert history holder 1105 and read at least one vehicle event (vehicle event history) from vehicle event history holder 1106. Then, by arranging the at least one security alert read and the at least one vehicle event read in the order of occurrence, central ECU 101 may generate the history information illustrated in FIG. 9. The start of analysis of an intrusion path of an attack may trigger central ECU 101 to generate the history information illustrated in FIG. 9.

The example in FIG. 9 illustrates the history information in which the depth increases over time. However, security alerts having depths deceasing over time or remaining at the same depth over time may occur.

Although no security alert corresponding to depth "2" is detected, the security sensor of the device corresponding to depth "2" (such as security sensor 1202 of Ethernet switch 102) is assumed to overlook anomalous operation. In Embodiment, the history information is transmitted to server 30. Thus, the security analyst can verify whether this anomalous operation is overlooked. The history information is an example of information that allows the intrusion path of the attack to be identified.

Note that a depth for a vehicle event is predetermined. The depth for the vehicle event may be set depending on a device that executes this vehicle event (for example, depending on the number of physical intermediate devices from TCU 100). For example, the depth may be the same as the depth in the case where the security sensor of this device detects anomalous operation. Alternatively, the depth for the vehicle event may be set depending on details of the vehicle event. For example, central ECU 101 may store the depth for the vehicle event. However, this is not intended to be limiting.

In Embodiment, the analysis report including the history information is transmitted in plaintext form. However, the analysis report may be transmitted in encrypted form and may include a message authentication code.

The analysis report may include information about a device or domain (network) that is an entry point of the attack. Moreover, the analysis report may include information about a path by which the intrusion is proceeding in what manner (for example, whether the intrusion is spreading with increase in depth or whether the attack remains locally). The analysis report may include information about caution issuance corresponding to the depth of the current attack.

An example of the information included in the analysis report is described later (see FIG. 19).

[1.10 Example of Security Alert History]

FIG. 10 illustrates an example of the security alert history stored in security alert history holder 1105, according to Embodiment. Security alert history holder 1105 stores a history of the received security alert as illustrated in FIG. 8.

FIG. 10 illustrates a history of three security alerts received. A first security alert occurs at "11:45:10", and has depth "1", alert No. "23042", alert ID "0011", and a transmission IP address "aaa.bbb.ccc.ddd" as details of the alert. A second security alert occurs at "11:47:15", and has depth "3", alert No. "5000", alert ID "0010", and a signature ID "0x12345" as details of the alert. A third security alert occurs at "11:50:20", and has depth "5", alert No. "10001", alert ID "0001", and "verification failure of message authentication code with ID "100" as the details of the alert.

Note that the security alert history illustrated in FIG. 10 may include a different kind of alert.

[1.11 Example of Vehicle Event History]

FIG. 11 illustrates an example of the vehicle event history stored in vehicle event history holder 1106, according to Embodiment. Vehicle event history holder 1106 holds a history of an event (vehicle event) indicating a change in an in-vehicle state of vehicle 10, unlike a security alert. The vehicle event may be obtained from a frame passing through the in-vehicle network or from a change in an internal state of ECU 104 etc. For example, the vehicle event may be obtained by application unit 1102 on the basis of the frame passing through the in-vehicle network or the change in the internal state of ECU 104 etc. Application unit 1102 functions as an event obtainer that obtains a vehicle event occurring within the in-vehicle network.

Examples of the vehicle event include: a login to a device included in the in-vehicle network; completion of installation or update of an application or firmware that is included or to be installed in this device; completion of transfer of the firmware; a system diagnosis; and transmission of a failure code. However, this is not intended to be limiting. For example, the vehicle event may be: a change in a state of a door key of the vehicle between open and close; a change in a state of an ignition switch between ON and OFF; start of traveling; activation or deactivation of the driving assistance function; shift into an automated driving mode; completion of firmware update for an in-vehicle ECU; completion of update or new installation of an application; start of diagnostic communication; or notification about a system login.

Even if such a vehicle event is normally executed, this event may be executed by an attacker as a result of disabling the security function. For this reason, vehicle event history holder 1106 holds even the vehicle event that is normally completed. The vehicle event held is used for determining, by using a different security alert together, whether this event is exploited by the attacker. Moreover, the vehicle event held is also used for analyzing a situation where the security alert occurs.

For example, the security alert may occur as a result of a false detection by security sensor 1004 etc. or a breakdown occurring to a part of the vehicle system. On this account, analysis engine 1103 analyzes the vehicle event together with the situation where the security alert occurs. For example, analysis engine 1103 filters out the security alert occurring in response to the vehicle event prone to a false detection or the security alert resulting from a breakdown. This increases the accuracy of the analysis report.

FIG. 11 illustrates the vehicle events as follows. The ignition of the vehicle is turned on at 11:24:00, and the vehicle starts traveling at 11:26:06. Then, the automated driving mode is activated at 11:31:35, and the application update of central ECU 101 is completed at 11:48:30.

Vehicle event history holder 1106 may hold the vehicle event history illustrated in FIG. 11 in association with the depth for each vehicle event.

[1.12 Intrusion Path Analysis Sequence Performed by Central ECU 101]

Figure 12:
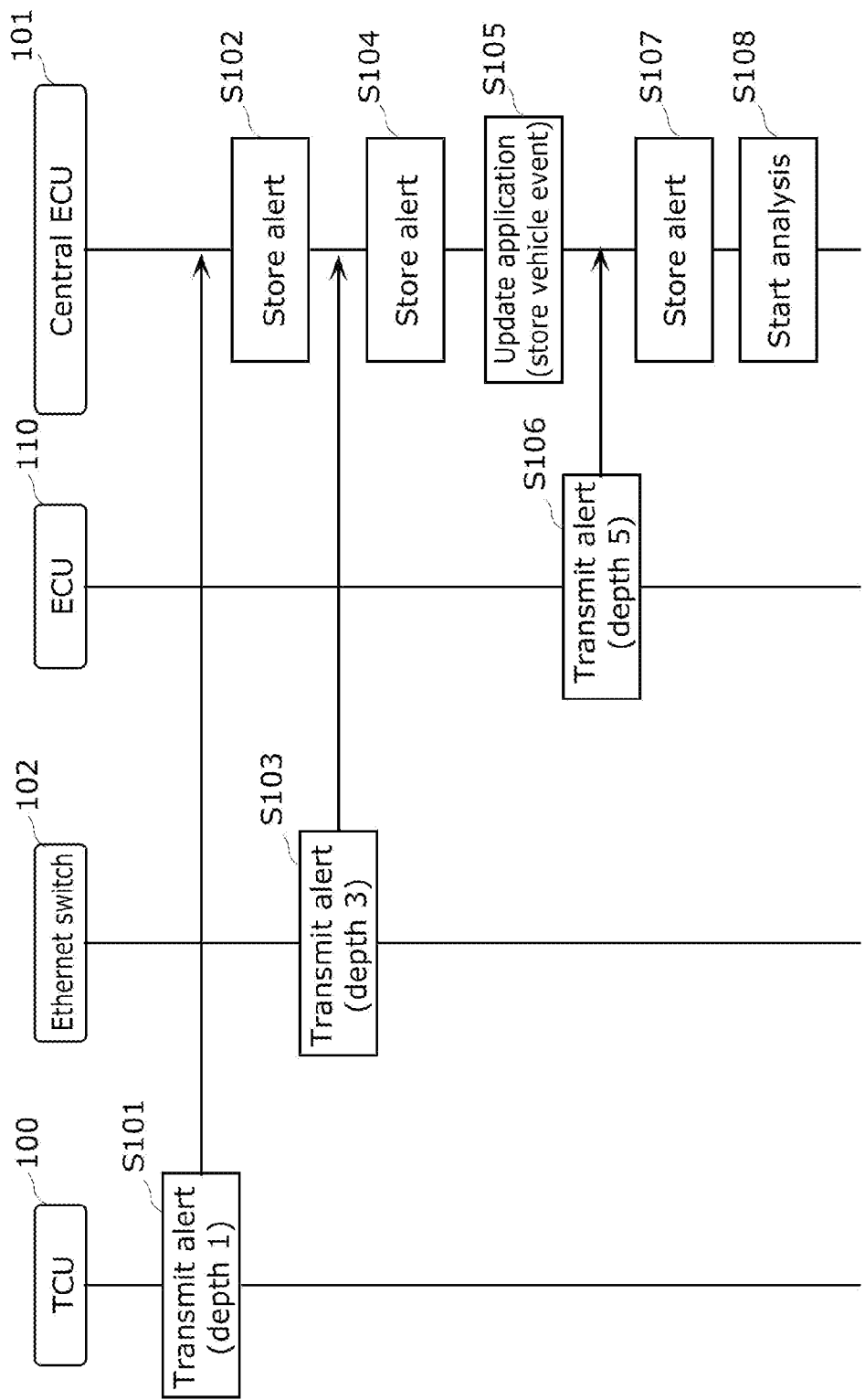
FIG. 12 is a first intrusion path analysis sequence performed by the central ECU according to Embodiment.

FIG. 12 is a first intrusion path analysis sequence performed by central ECU 101 according to Embodiment. The first intrusion path analysis sequence illustrated in FIG. 12 corresponds to a first half of the intrusion path analysis sequence performed by central ECU 101.

(S101) TCU 100 transmits a security alert (depth 1).

(S102) Central ECU 101 receives the security alert and holds (stores) the security alert in security alert history holder 1105.

(S103) Ethernet switch 102 transmits a security alert (depth 3).

(S104) Central ECU 101 receives the security alert and stores the security alert into security alert history holder 1105.

(S105) Central ECU 101 updates the application and stores information about the completion of the update into vehicle event history holder 1106.

(S106) ECU 110 transmits a security alert (depth 5).

(S107) Central ECU 101 receives the security alert and stores the security alert into security alert history holder 1105.

(S108) Central ECU 101 starts an analysis of the intrusion path. For example, central ECU 101 may start the analysis of the intrusion path if receiving a security alert having a depth greater than a predetermined threshold value (Yes in Step S203 illustrated in FIG. 14 for instance) or if the transmission is made according to regular transmission (notification) timing (Yes in Step S208).

A trigger for central ECU 101 to start the analysis of the intrusion path is described later. In Steps S101, S103, and S105, central ECU 101 is not notified about the indicators of the security alerts (about the information as the indicators of the attack).

Until an operation illustrated in FIG. 13 described later is performed, a security alert and a vehicle event continue to be collected.

Figure 13:
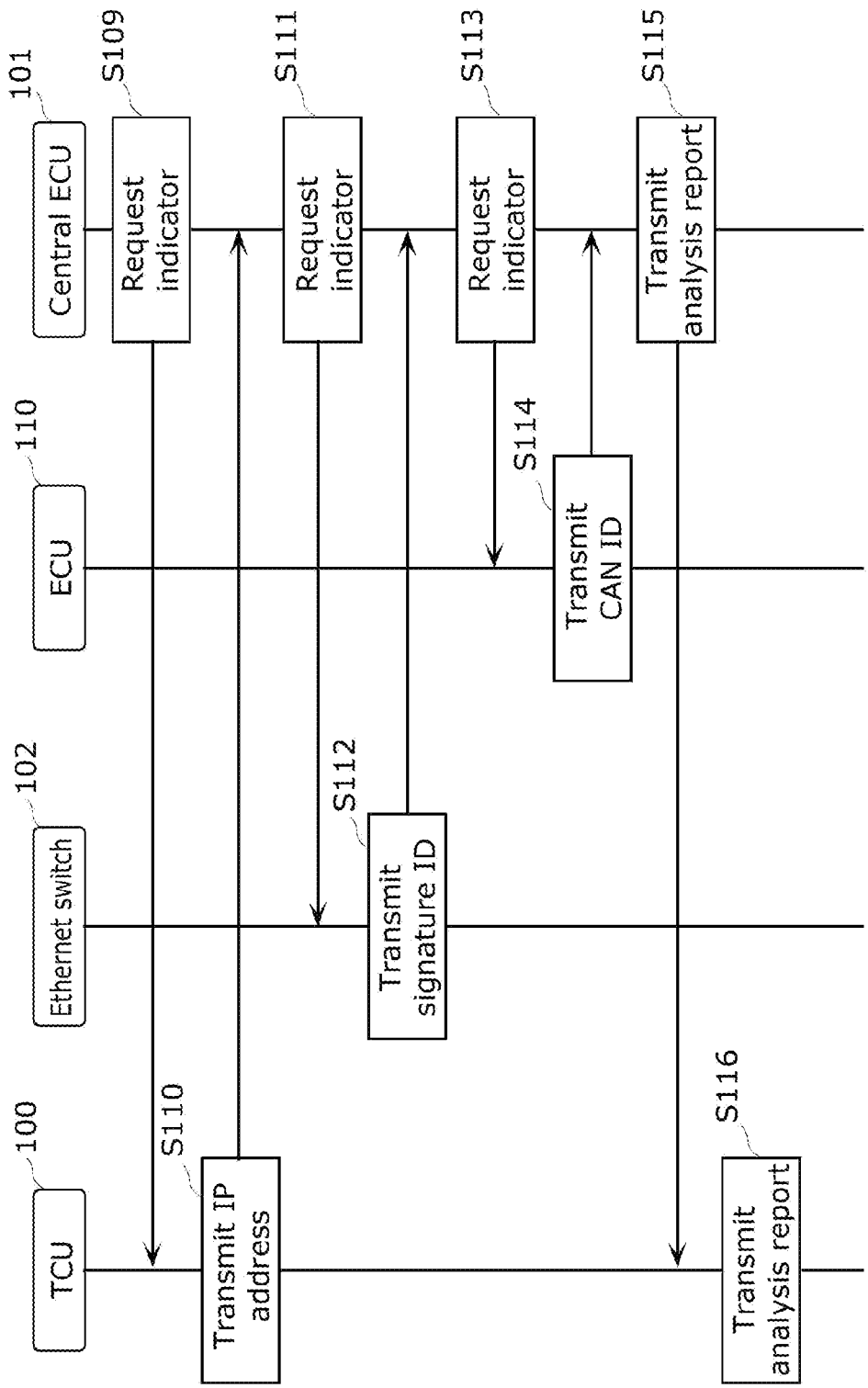
FIG. 13 is a second intrusion path analysis sequence performed by the central ECU according to Embodiment.

FIG. 13 is a second intrusion path analysis sequence performed by central ECU 101 according to Embodiment. The second intrusion path analysis sequence illustrated in FIG. 13 corresponds to a second half of the intrusion path analysis sequence performed by central ECU 101. An operation illustrated in FIG. 13 is performed after the operation illustrated in FIG. 12.

(S109) Central ECU 101 requests the indicator of the security alert (depth 1).

(S110) TCU 100 receives the request for the indicator and provides notification of (transmits) information about a transmission source IP address as the indicator of the security alert (depth 1).

(S111) Central ECU 101 requests the indicator of the security alert (depth 3).

(S112) Ethernet switch 102 receives the request for the indicator and provides notification of (transmits) a signature ID as the indicator of the security alert (depth 3).

(S113) Central ECU 101 requests the indicator of the security alert (depth 5).

(S114) ECU 110 receives the request for the indicator and provides notification of (transmits) a CAN ID as the indicator of the security alert (depth 5).

(S115) Central ECU 101 generates an analysis report based on the obtained information and provides notification of (transmits) the analysis report to TCU 100.

(S116) TCU 100 provides notification of (transmits) the analysis report transmitted from central ECU 101, to server 30.

Note that the order in which central ECU 101 requests the indicators of the security alerts is not limited to the order in which the security alerts are received.

In Embodiment, central ECU 101 requests the indicators of the security alerts when analyzing the intrusion path. However, the indicators are not to be collected. The indicators may be included in notifications of the security alerts (S101, S103, and S106 in FIG. 12).

[1.13 Analysis Report Transmission Flowchart Performed by Central ECU]

Figure 14:
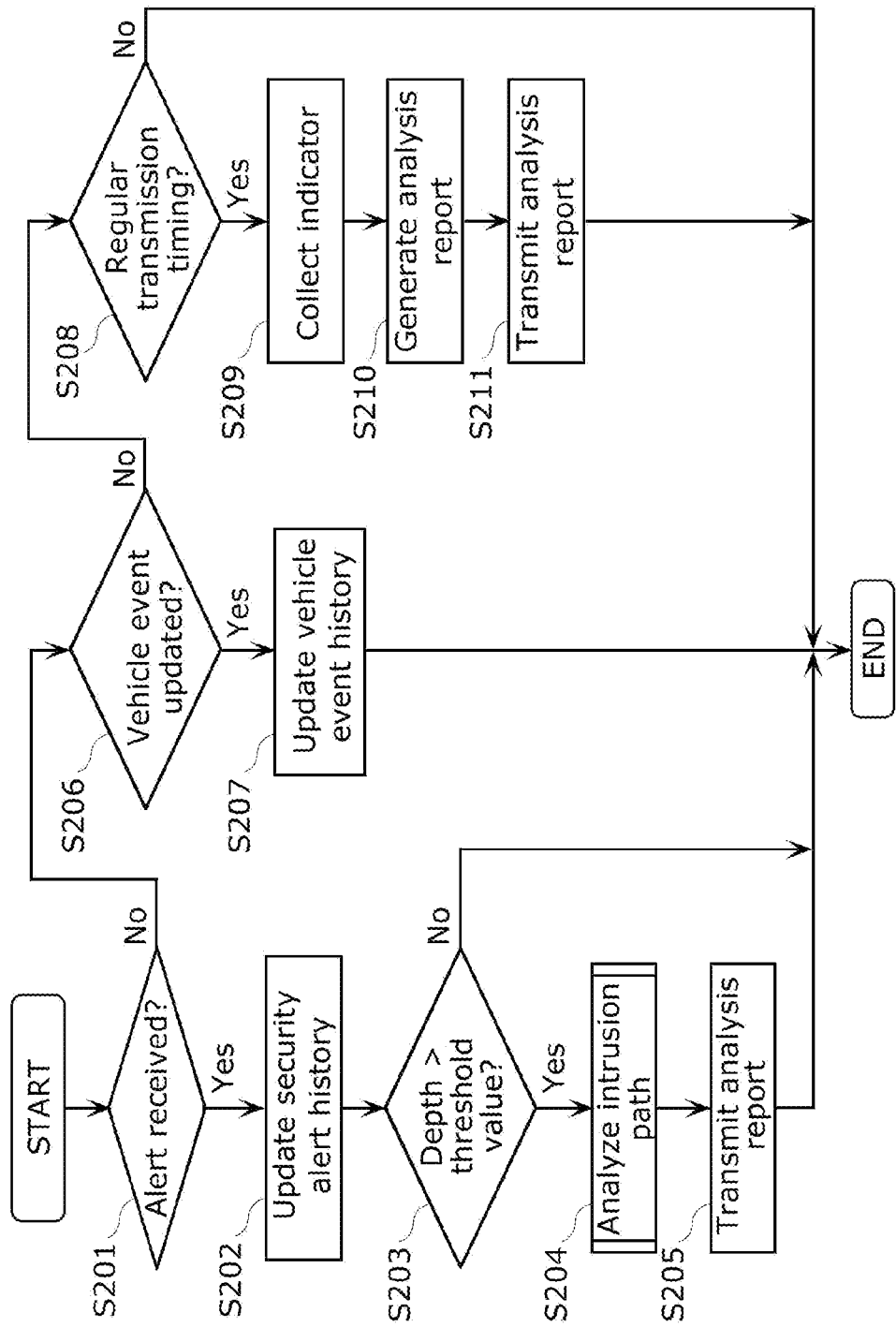
FIG. 14 is a flowchart performed by the central ECU until an analysis report is transmitted, according to Embodiment.

FIG. 14 is a flowchart performed by central ECU 101 until an analysis report is transmitted, according to Embodiment. FIG. 14 may illustrate a flowchart performed by central ECU 101 to generate an analysis report. Processes described below are executed by analysis engine 1103 of central ECU 101. The following describes, as an example, that an analysis report is generated using a vehicle event. However, the vehicle event may not be necessarily used.

Central ECU determines whether a security alert is received (S201). If the security alert is received (Yes in S201), central ECU 101 executes Step S202. If the security alert is not received (No in S201), central ECU 101 executes Step S206.

If the security alert is received, central ECU 101 next updates the security alert history of security alert history holder 1105 (S202). Central ECU 101 adds the security alert received in Step S201 to the security alert history.

Next, central ECU 101 determines whether a depth of the security alert received is greater than the predetermined threshold value (S203). Central ECU 101 makes this determination of Step S203 whenever a security alert is received. If the depth of the security alert received is smaller than or equal to the predetermined threshold value (No in S203), central ECU 101 ends the processing of generating the analysis report. If the depth of the security alert received is greater than the predetermined threshold value (Yes in S203), central ECU 101 executes Step S204.

Next, central ECU 101 analyzes the intrusion path of the attack (S204). The analysis of the intrusion path is described later.

Following this, central ECU 101 generates the analysis report on the basis of the result of the analysis and transmits the generated analysis report to server 30 (S205). Then, central ECU 101 ends the processing of generating the analysis report.

If no security alert is received, central ECU 101 determines whether the vehicle event is updated (S206). Central ECU 101 verifies whether a frame related to the update of the vehicle event is received or whether the application of central ECU 101 is updated. If the vehicle event is updated (Yes in S206), central ECU 101 updates the vehicle event history stored in vehicle event history holder 1106 (S207). Then, central ECU 101 ends the processing of generating the analysis report. More specifically, if it is determined as "Yes" in Step S206, the vehicle event is simply added to the vehicle event history and no analysis report is generated.

If the vehicle event is not updated (No in S206), central ECU 101 determines whether this is regular timing of analysis report transmission (S208). If this is not the regular timing of transmission (No in S208), central ECU 101 ends the processing of generating the analysis report. If this is the regular timing of transmission (Yes in S208), central ECU 101 collects the indicator corresponding the security alert to be stored into the security alert history holder 1105 (S209). If no security alert history is stored, no indicator may be collected in Step S209. The process of Step S209 corresponds to Steps S109 to S114 illustrated in FIG. 13 for example.

Central ECU 101 generates the analysis report based on the collected information (S210) and transmits the generated analysis report to server 30 (S211). Then, central ECU 101 ends the processing of generating the analysis report.

[1.14 Flowchart of Intrusion Path Analysis Performed by Central ECU 101]

Figure 15:
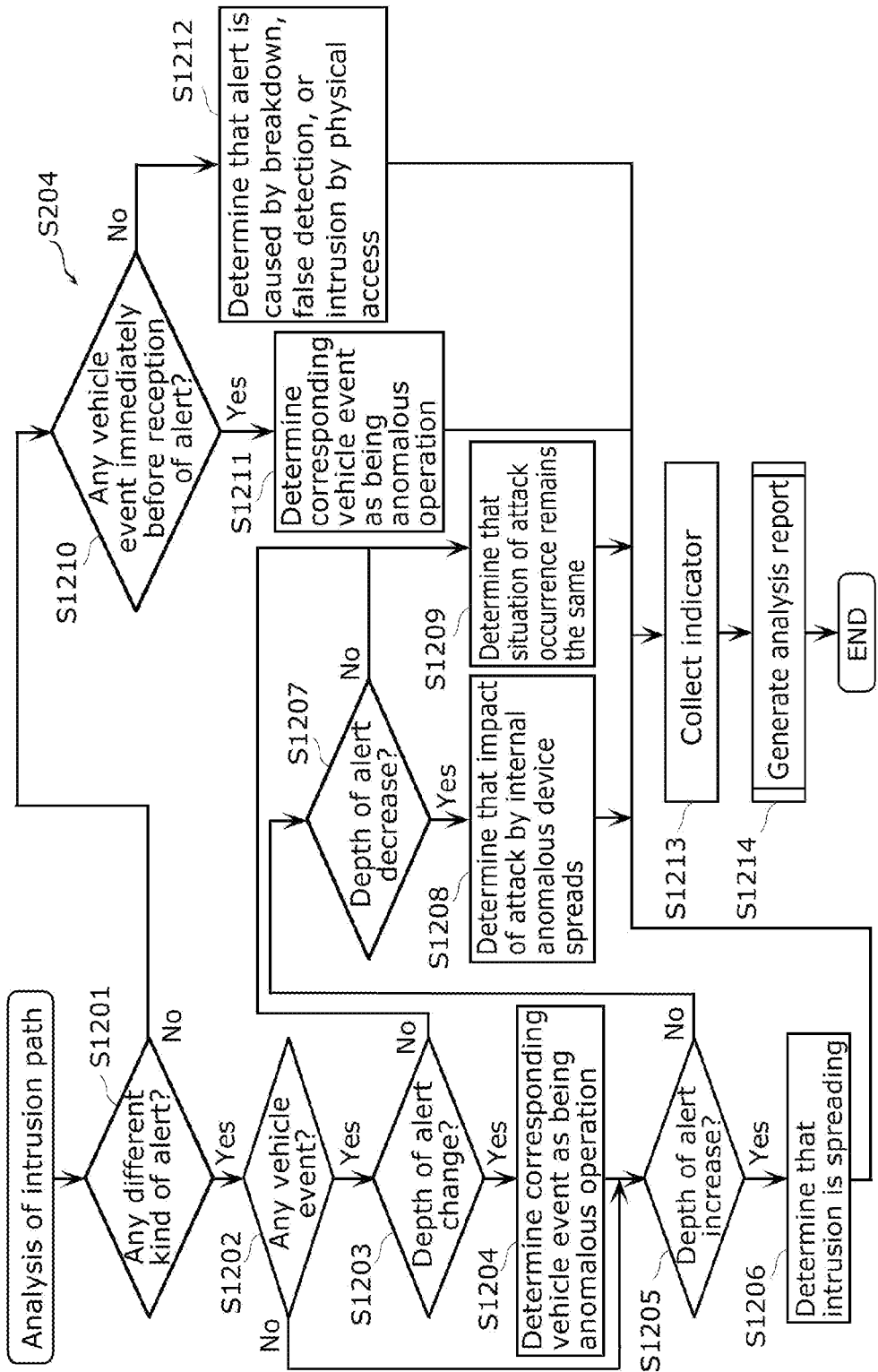
FIG. 15 is a flowchart illustrating details of Step S204 included in FIG. 14.

FIG. 15 is a flowchart illustrating details of Step S204 included in FIG. 14. The flowchart illustrated in FIG. 15 is performed when the depth of the security alert received in Step S201 is greater than the predetermined threshold value. Central ECU 101 verifies (determines) whether a security alert of a different kind is stored in security alert history holder 1105 (S1201). For example, central ECU 101 may make the verification in Step S1201 by determining whether a security alert received within a predetermined period of time after the reception of the security alert in Step S201 is stored in security alert history holder 1105. Here, a security alert of a different kind has at least one of a different depth or a different alert ID.

If no security alert of any different kind is stored (No in S1201), central ECU 101 executes Step S1210.

If a security alert of a different kind is stored (Yes in S1201), central ECU 101 verifies whether a vehicle event occurs within a period of time while a security alert is occurring (for example, from the occurrence time of the earliest security alert stored in the security alert history to the present time) (S1202). If it is determined as "Yes" in Step S1201, at least two different kinds of security alerts are stored.

If no vehicle event occurs (No in S1202), central ECU 101 executes Step S1205.

If a vehicle event occurs (Yes in S1202), central ECU 101 verifies whether the depth of the security alert changes (such as whether a depth that has not been detected is detected) around the occurrence time of the vehicle event (S1203). For example, if the depth of the security alert increases or decreases around the occurrence time of the vehicle event, central ECU 101 determines that the depth changes. If the depth of the security alert changes by a predetermined change or more around the occurrence time of the vehicle event in Step S1203, central ECU 101 may determine that the depth changes.

As described above, if a plurality of security alerts of different kinds are stored, central ECU 101 determines whether the vehicle event is caused by an attack on the basis of the temporal change in depths of the plurality of security alerts and the vehicle event occurring while the plurality of security alerts are detected. For example, if depth occurrence distribution (depth time distribution) changes around the occurrence time of the vehicle event included in the vehicle event history, central ECU 101 determines that the vehicle event is caused by the attack.

If the depth of the security alert does not change (No in S1203), central ECU 101 executes Step S1209.

If the depth of the security alert changes (Yes in S1203), central ECU 101 determines that this vehicle event is an anomalous vehicle event caused by the attack (S1204). Note that this vehicle event may be related to the security alert occurring around the occurrence time of this vehicle event.

Next, central ECU 101 verifies whether the depths of the security alerts increase with later occurrence times of the security alerts stored in security alert history holder 1105 (S1205). More specifically, central ECU 101 determines whether the depth of the security alert increases over time, from past to present. Here, the depth of the security alert may not necessarily monotonically increase. For example, if an order of occurrence of security alerts corresponding to depths each detected for the first time shows an increasing trend, central ECU 101 may determine that the depth of the security alert increases. For example, suppose that the order of occurrence of the security alerts in the security alert history by depth is 1, 2, 1, 2, 3, 2, 1, 3, 1, and 4. In this case, the order of occurrence of the security alerts each corresponding to a different depth detected for the first time is 1, 2, 3, and 4. Thus, central ECU 101 determines that the depth increases over time.

If the depths of the security alerts increase over time (for example, the depths are on the increasing trend) (Yes in S1205), central ECU 101 determines that the intrusion is spreading (S1206). Then, central ECU 101 executes Step S1213.

If the depths of the security alerts do not increase over time (No in S1205), central ECU 101 executes Step S1207.

Next, central ECU 101 verifies whether the depths of the security alerts decrease over time (S1207). If the depths of the security alerts decrease over time (Yes in S1207), central ECU 101 determines that an anomalous device connected inside vehicle 10 for example spreads an impact of the attack from a location corresponding to a greater depth (S1208). Then, central ECU 101 executes Step S1213. For example, assume that no anomaly is detected in the devices corresponding to smaller depths of the security alerts, such as TCU 100 and Ethernet switch 102. Assume here also that an anomaly is suddenly detected in the device corresponding to a greater depth of the security alert, such as ECU 111. In this case, central ECU 101 determines that an anomalous device connected to ECU 111 for example spreads the attack from ECU 111 as a starting point.

If the depths of the security alerts do not decrease over time (No in S1207), or more specifically, if the depths of the security alerts are the same, central ECU 101 determines that the situation of attack occurrence remains the same (S1209). Then, central ECU 101 executes Step S1213.

If no security alert of any different kind is stored, or more specifically, if only one security alert is stored, central ECU 101 verifies whether a vehicle event is stored in vehicle event history holder 1106 immediately before the reception of the security alert (S1210). This determination in Step S1210 is made to determine whether any vehicle event related to the received security alert is stored.

If the vehicle event is stored immediately before the reception of the security alert, it is determined that the received security alert and the vehicle event are related to each other. Here, a time period corresponding to the phrase "immediately before" is predetermined, and refers to a few minutes or a dozen minutes or so for instance. However, this is not intended to be limiting.

Next, if such a vehicle event is stored (Yes in S1210), central ECU 101 determines that this vehicle event is an anomalous vehicle event caused by the attacker (S1211). Then, central ECU 101 executes Step S1213. More specifically, if determining that the vehicle event relates to the security alert as a result of analyzing the intrusion path, central ECU 101 may determine that this vehicle event is caused by the attack.

If no such a vehicle event is stored (No in S1210), central ECU 101 determines that the security alert is caused by breakdown, false detection (resulting from breakdown for instance), or an intrusion by physical access (S1212). Then, central ECU 101 executes Step S1213. If determining as "No" in Step S1210, central ECU 101 may end the processing of analyzing the intrusion path.

After this, central ECU 101 collects an indicator for each security alert stored in security alert history holder 1105 (S1213), and generates the analysis report after this collection (S1214). Then, central ECU 101 ends the processing of analyzing the intrusion path. The processing of generating the analysis report is described later (see FIG. 17 described later). The process of Step S1213 corresponds to Steps S109 to S114 illustrated in FIG. 13 for example.

In this way, central ECU 101 may analyze the intrusion path as follows, for example. If the depth of the security alert increases over time, central ECU 101 may determine that the intrusion situation is spreading. If the depth of the security alert decreases over time, central ECU 101 may determine that the intrusion situation is caused by the attack from the anomalous device. If the depth of the security alert does not change over time, central ECU may determine that the intrusion situation remains the same. Moreover, central ECU 101 may include the result of the determination in the analysis report and then output this analysis report.

This allows the security analyst to know the current intrusion situation. Thus, the security analyst can use this intrusion situation for analyzing the attack.

Note that the determination in Step S1210 may not be made. In this case, central ECU 101 may analyze the intrusion path as follows. If no security alert of any different kind is stored, or more specifically, if only one security alert is stored and also the depth of this security alert is greater than the predetermined threshold value, central ECU 101 may determine that the security alert is caused by false detection or an intrusion by physical access.

[1.15 Advantageous Effects of Embodiment]

Central ECU 101 (an example of the intrusion path analysis device) according to Embodiment collects a security alert transmitted from security sensor 1004 etc. included in vehicle 10. Then, central ECU 101 generates an analysis report as a result of determining an intrusion path of an attack on the basis of: a depth included in the collected security alert and determined depending on a monitoring target, such as security sensor 1004 etc.; and an occurrence time of the security alert. Central ECU 101 outputs the generated analysis report. This enables server 30 to present the detailed analysis report to the security analyst. Thus, the security analyst can quickly grasp the occurrence situation of the attack and the entry point for example, and then immediately take a countermeasure.

Moreover, analysis engine 1103 analyzes the vehicle event together with the security alert. Thus, analysis engine 1103 is capable of determining whether even the vehicle event that is normally completed is exploited by the attacker. This enables understanding of the impact of the attack that is undetectable by security sensor 1004 etc. Moreover, the security analyst can also further grasp an overall situation of the attack and take a countermeasure.

Other Variations

Although the present disclosure has been described by way of Embodiment above, it should be obvious that the present disclosure is not limited to Embodiment described above. Variations described below may also be included in the present disclosure.

(1) Embodiment above describes a case where CAN and Ethernet (registered trademark) networks are used for the in-vehicle network. However, this is not intended to be limiting. The in-vehicle network may be a CAN with flexible data rate (CAN-FD), an Ethernet network, a local interconnect network (LIN), or a Flexray network, or a combination of any of these.

(2) In Embodiment above, the intrusion path is analyzed in central ECU 101. However, the intrusion path may not be analyzed in central ECU 101. For example, the intrusion path may be analyzed in a head unit or TCU 100. Alternatively, the security alert may be transmitted to server 30, which then may analyze the intrusion path. To be more specific, the function of analysis engine 1103 may be divided between server 30 and vehicle 10 in any way. For example, if analysis engine 1103 is included in server 30, analysis engine 1103 is communicably connected to the in-vehicle network (to allow wireless communication, for example).

(3) Embodiment above describes a case where security sensor 1004 etc. are the network IDS and the host IDS that detect a verification failure of a message authentication code for example. Anomalies detected by the security sensors are not limited to this. For example, results of detection by security sensor 1004 etc. may also include: a failure of security access for diagnosis; a failure of ssh login; a result of filtering by a firewall; and a verification failure of update. Moreover, the locations of the security sensors are not limited to those described in Embodiment above, and the security sensors may be freely placed.

(4) Although the depth is included in the security alert according to Embodiment above, the depth may not be necessarily included. The security alert may include information that allows analysis engine 1103 to identify the monitoring target, such as security sensor 1004 etc., and to calculate the depth.

FIG. 16 illustrates an example of a database on the locations of the security sensors, according to the present variation. For example, analysis engine 1103 may hold the database on the locations of the security sensors as illustrated in FIG. 16. Then, analysis engine 1103 may grasp (calculate, for example) the depth from the alert ID and transmission source information included in the security alert.

The example in FIG. 16 illustrates that the depth of the security alert outputted from the network IDS placed in TCU 100 is 1 and that the depth of the security alert outputted from the host IDS also placed in TCU 100 is 2. In this way, a different depth may be set depending on a monitoring target for each of the security sensors even if these security sensors are placed in the same device. Moreover, this example illustrates that the depth of the security alert outputted from the network IDS placed in Ethernet switch 102 is 3 and that the depth of the security alert outputted from the host IDS placed in central ECU 101 is 4. Furthermore, this example illustrates that the depth of the security alert outputted based on the result of verification of the message authentication code from central ECU 101 and ECUs 108, 109, and 110 is 5 and that the depth of the security alert outputted from the network IDS placed in Ethernet switch 103 is 6. Moreover, this example illustrates that the depth of the security alert outputted from the host IDS placed in ECU 107 is 7 and that the depth of the security alert outputted from the network IDS placed in ECU 107 is 8.

(5) Although Embodiment above describes a case where the number of externally-connected devices is one, which is TCU 100. However, the number of externally-connected devices is not limited to one. For example, a head unit including Bluetooth or a USB connection interface, or an OBD port may also be used, for example. In this case, the depth corresponding to the monitoring target, such as security sensor 1004 etc., changes because the number of intermediate points is different for each of the externally-connected devices. On this account, the depths corresponding to the externally-connected devices may be calculated, and then the smallest depth obtained as a result of the calculation may be adopted as the depth.

(6) In Embodiment above, TCU 100 transmits the analysis report to server 30. However, the analysis report may not be transmitted to server 30 via TCU 100. For example, central ECU 101 may include a communication interface for enabling wireless communication via a mobile telephone network and transmit the analysis report directly to server 30. Alternatively, central ECU 101 may hold the analysis report as a log instead of transmitting the analysis report to server 30 and then may read the analysis report in response to a diagnostic command for instance.

(7) In Embodiment above, central ECU 101 transmits the analysis report regularly. However, the analysis report may not be transmitted regularly. This is effective in reducing the amount of communication performed on server 30.

(8) In Embodiment above, central ECU 101 analyzes the intrusion path and transmits the analysis report when receiving the security alert having the depth exceeding the predetermined threshold value. Here, if the security alert of the same kind is stored in the security alert history, this means that the analysis of the intrusion path and the transmission of the analysis report have been executed. Thus, in this case, these processes may be omitted. This is effective in reducing resource consumption of central ECU 101 and in reducing the amount of communication performed on server 30.

(9) In Embodiment above, security alert history holder 1105 holds the history of the received security alerts and vehicle event history holder 1106 holds the history of the received vehicle events. However, the history of the security alerts and the history of the vehicle events may be deleted after a predetermined period of time. This eliminates the need for considering the impact of the security alert or vehicle event unrelated to the most recent attack, from the analysis of the intrusion path. Thus, this is effective in enhancing the accuracy of the analysis report.

(10) In Embodiment above, central ECU 101 only transmits the analysis report and does not take a countermeasure in vehicle 10. However, depending on the intrusion situation, central ECU 101 may issue a caution and provisionally take a countermeasure corresponding to the caution in vehicle 10. This can keep the attack from further spreading and is effective in enhancing the security.

Figure 17:
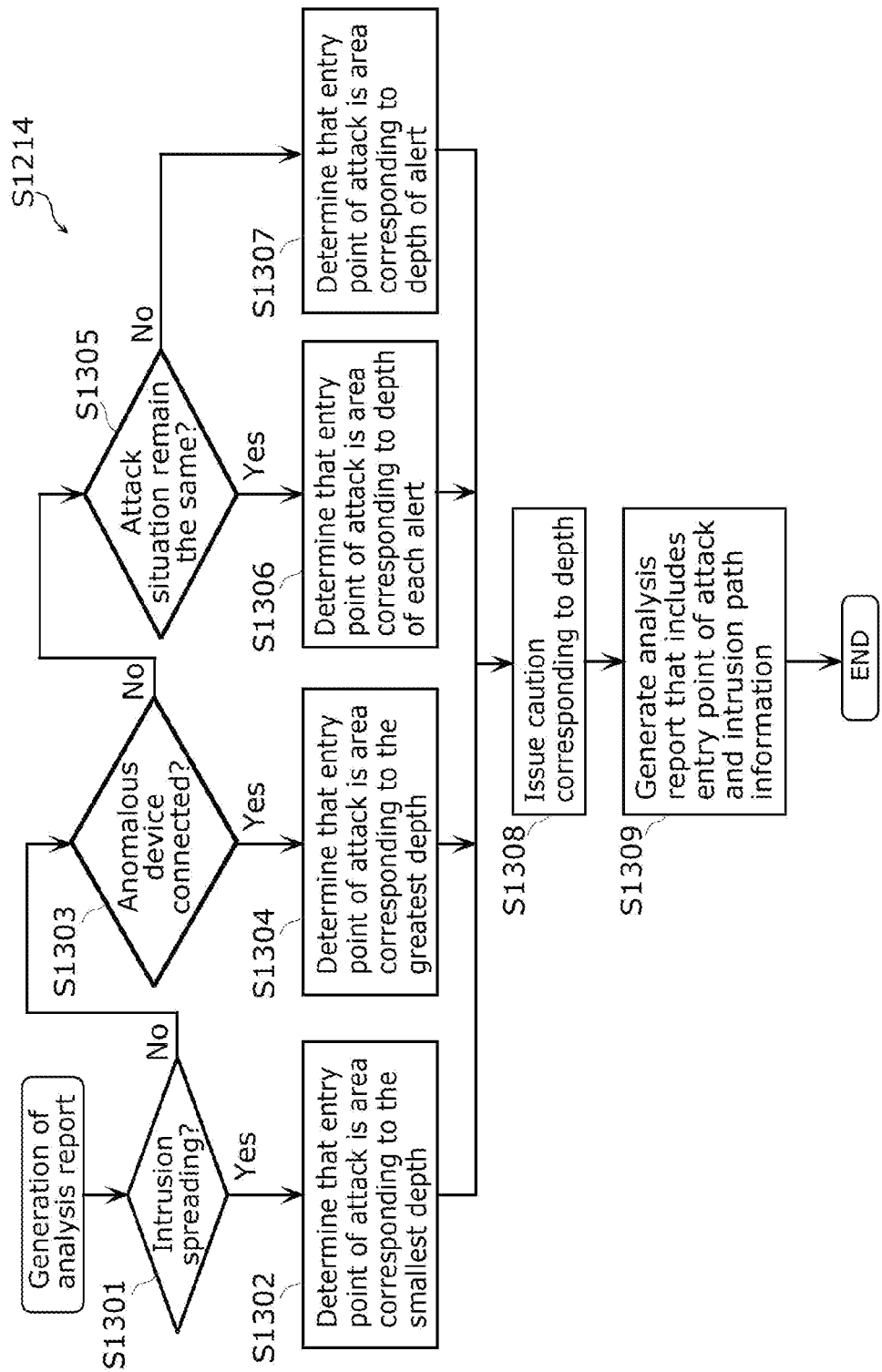
FIG. 17 is a flowchart for determining a countermeasure corresponding to a result of an intrusion path analysis performed by a central ECU, according to another variation of Embodiment.

FIG. 17 is a flowchart for determining the countermeasure corresponding to the result of the intrusion path analysis performed by central ECU 101, according to the present variation. The flowchart illustrated in FIG. 17 is performed to determine the entry point of the attack and the countermeasure against the attack on the basis of the results of the determination in Steps S1206, S1208, and S1209 illustrated in FIG. 15. Note that each of processes in Steps S1301 to S1307 illustrated in FIG. 17 is performed to determine the entry point of the attack.

Central ECU 101 verifies (determines) whether it is determined, as a result of the intrusion path analysis performed as in FIG. 15, that the intrusion is spreading (S1301). If the determination in Step S1206 is made, central ECU 101 determines "Yes" in Step S1301. If the determination in Step S1206 is not made, central ECU 101 determines "No" in Step S1301.

If determining that the intrusion is spreading (Yes in S1301), central ECU 101 determines that the entry point of the attack is an area corresponding to the smallest depth among the depths of the security alerts stored in security alert history holder 1105 (for example, an area peripheral to the monitoring target, such as security sensor 1104 etc.) (S1302). Then, central ECU 101 executes Step S1308. Here, central ECU 101 may determine in Step S1302 that the greatest depth among the depths of the security alerts stored in security alert history holder 1105 is the current intrusion depth of the attack. In this case, the depth of the entry point of the attack is different from the intrusion depth of the attack.

If it is not determined that the intrusion is spreading (No in S1301), central ECU 101 determines whether the attack is spreading because an anomalous device is internally connected (S1303). If the determination in Step S1208 is made, central ECU 101 determines "Yes" in Step S1303. If the determination in Step S1208 is not made, central ECU 101 determines "No" in Step S1303.

If it is determined that the attack impact is spreading because the anomalous device is internally connected (Yes in S1303), central ECU 101 determines that the entry point of the attack is an area corresponding to the greatest depth among the depths of the security alerts stored in security alert history holder 1105 (S1304). Then, central ECU 101 executes Step S1308. Here, central ECU 101 may determine in Step S1304 that the greatest depth among the depths of the security alerts stored in security alert history holder 1105 is the intrusion depth of the attack. In this case, the depth of the entry point of the attack is the same as the intrusion depth of the attack.

If it is not determined that the attack impact is spreading because the anomalous device is internally connected (No in S1303), central ECU 101 determines whether the attack situation remains the same (S1305). If the determination in Step S1209 is made, central ECU 101 determines "Yes" in Step S1305. If the determination in Step S1209 is not made, central ECU 101 determines "No" in Step S1305.

If it is determined that the attack situation remains the same (Yes in S1305), central ECU 101 determines that the entry point of the attack is an area corresponding to the depth of the security alerts stored in security alert history holder 1105 (S1306). Then, central ECU 101 executes Step S1308. Here, because the depths of the security alerts stored in security alert history holder 1105 are the same, central ECU 101 may determine in Step S1306 that this depth (the same depth) is the intrusion depth of the attack. In this case, the depth of the entry point of the attack is the same as the intrusion depth of the attack.

If it is not determined that the attack situation remains the same (No in S1305), or more specifically, if it is determined that the attack situation changes, central ECU 101 determines that the depth of the security alert stored in security alert history holder 1105 indicates the depth of the entry point of the attack and the intrusion depth (S1307). Then, central ECU 101 executes Step S1308. In Step S1307, central ECU 101 determines that the entry point of the attack is an area corresponding to the depth of the alert. Here, if "No" in Step S1305, central ECU 101 may not determine the entry point of the attack. To be more specific, if "No" in Step S1305, a caution may not be issued.

In this way, central ECU 101 performs the analysis on the intrusion path as follows for example. If the intrusion situation is spreading, central ECU 101 determines that the entry point of the attack is an area corresponding to the smallest depth. If the intrusion situation is caused by the attack from an anomalous device, central ECU 101 determines that the entry point of the attack is an area corresponding to the greatest depth. If the intrusion situation remains the same, central ECU 101 determines that the entry point of the attack is an area corresponding to the constant depth. Moreover, central ECU 101 may include the result of the determination in the analysis report and then output this analysis report.

Thus, central ECU 101 allows the security analyst to identify the entry point of the attack. The analysis report allows the security analyst to find out the intrusion path and the intrusion method of the attack. This allows the security analyst to obtain information useful for determining a countermeasure against the attack.

Next, central ECU 101 issues a caution to a target device, such as ECU 104 etc., corresponding to the intrusion depth (S1308). For example, depending on the depth of the security alert, central ECU 101 may execute at least one of: strengthening of a function of monitoring at least one among at least one ECU 104 etc. and TCU 100; or restriction on a function of at least one of at least one ECU 104 etc. or TCU 100. The caution is determined and issued before the information indicating the countermeasure is received from server 30. For example, the caution may be determined and issued before the analysis report is transmitted to server 30. An example of the caution issuance is described with reference to FIG. 18.

Next, central ECU 101 generates the analysis report that includes the entry point of the attack and the intrusion path information (indicating whether the intrusion is spreading, the impact of the attack spreads due to the anomalous device internally connected, the situation of the attack remains the same, the intrusion is made by physical access, or the intrusion is false detection) (S1309). An example of the analysis report is described with reference to FIG. 19.

FIG. 18 illustrates an example of a relationship between a target ECU to which a caution is to be issued and a countermeasure taken by this ECU, in association with a depth of a security alert, according to the present variation.

FIG. 18 illustrates that, for the depth (intrusion depth) of 1 or 2, the target ECU to which a caution is to be issued is TCU 100. TCU 100 responds to the caution by strengthening the monitoring function. For example, the strengthening of the monitoring function is achieved by the network IDS that additionally monitors up to payload information instead of simply monitoring header information of a received packet.

For the intrusion depth of 3 or 4, the target ECUs that receive the caution are TCU 100, Ethernet switch 102, ECU 104, ECU 105, and central ECU 101. Each of these ECUs responds to the caution by restricting updates of firmware and applications to prevent the attack from further spreading. This countermeasure is an example of partially disabling the function of in-vehicle network system 10a.

For the intrusion depth of 5 or 6, the target ECUs that receive the caution are ECU 106, ECU 107, ECU 108, ECU 109, ECU 110, Ethernet switch 103, and central ECU 101. Each of these ECUs responds to the caution by strengthening the monitoring function.

For the intrusion depth of 7 or 8, the target ECUs that receive the caution are ECU 107 and ECU 111. Each of these ECUs responds to the caution by restricting the automated driving function. If the intrusion depth is 7 or 8, which is already great enough, vehicle control is at high risk of being affected. On this account, the automated driving function that is highly exploitable for anomalous control over the vehicle is restricted as a countermeasure to reduce damage. This countermeasure is an example of partially disabling the function of in-vehicle network system 10a.

In this way, if it is determined that the intrusion situation is spreading and also that the greatest depth among the depths of the detected security alerts is greater than or equal to the predetermined threshold value, central ECU 101 may partially disable the function of in-vehicle network system 10a. Moreover, if it is determined that the intrusion is spreading and also that the greatest depth among the depths of the detected security alerts is greater than or equal to the predetermined threshold value, central ECU 101 may strengthen the function of monitoring some of the devices included in in-vehicle network system 10a. Furthermore, central ECU 101 may output a notification indicating that the function of in-vehicle network system 10a is partially disabled or that the function of monitoring some of the devices included in in-vehicle network system 10a is strengthened.

FIG. 19 illustrates an example of the analysis report according to the present variation.

The analysis report includes the history information illustrated in FIG. 9 and the entry point of the attack, for example. FIG. 19 illustrates a case where a device corresponding to depth 1 is the entry point. Note that the analysis report may include at least one of the entry point of the attack, the intrusion depth of the attack, or the history information. The analysis report may include information related to the determined countermeasure (the information indicating the strengthening of the monitoring function, the update restriction, or the restriction on the automated driving function). Moreover, the analysis report may include information indicating a result of assuming an ECU in which a next security alert is likely to occur. The information indicating the result of assumption may indicate the ECU that is directly connected to the device in which the most recent security alert in the history information occurs. Furthermore, the analysis report may include the depth of the most recent security alert as information indicating how far the attack is proceeding. Alternatively, the analysis report may include information indicating a current phase among seven phases of a cyber kill chain. The analysis report including such information is generated by central ECU 101.

(11) The analysis report according to Embodiment above may be outputted as threat intelligence. For example, the analysis report may be outputted using Structured Threat Information eXpression (STIX). This enables the analysis report to be used in a common format, which is thus effective in transmitting and receiving highly-compatible information.

(12) In Embodiment above, central ECU 101 outputs the analysis report indicating the result of determining the intrusion path of the attack. However, central ECU 101 may output a result of performing matching using the threat intelligence. For example, central ECU 101 may hold a threat database. If the number of matching indicators included in the threat intelligence held in the threat database exceeds a predetermined threshold value, central ECU 101 may identify details of the attack. FIG. 20 illustrates an example of the threat database held by central ECU 101 according to the present variation.

FIG. 20 illustrates that three pieces of threat information are held and that indicators are held for each of threats. Indicators of threat A are: "aaa.bbb.ccc.ddd" as the transmission source IP address; "0x56ab78cd90ef" as the hash value of the firmware; and "0x100", "0x110", and "0x200" as the CAN IDs. Indicators of threat B are: "www.xxx.yyy.zzz" as the transmission source IP address; "0x1234567890ab" as the hash value of the firmware; and "0x50" and "0x70" as the CAN IDs. Indicators of threat C are: "iii.jjj.kkk.lll" as the transmission source IP address; and "0xabcdef112233445566778899" as the Ethernet frame value.

(13) Each of the above-described devices may be a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor operates according to the computer program, thereby causing the constituent elements to execute functions of the devices and systems. Here, the computer program includes combinations of instruction codes for issuing instructions to the computer to execute predetermined functions.

(13) Each of the above-described devices may be a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor operates according to the computer program, thereby causing the constituent elements to execute functions of the devices and systems. Here, the computer program includes combinations of instruction codes for issuing instructions to the computer to execute predetermined functions.

(14) A part or all of the constituent elements in each of the devices according to the above embodiments may be implemented into a single Large-Scale Integration (LSI). The system LSI is a super multi-function LSI that is a single chip into which a plurality of constituent elements are integrated. More specifically, the system LSI is a computer system including a microprocessor, a ROM, a RAM, and the like. The RAM holds a computer program. The microprocessor operates according to the computer program, thereby causing each of the constituent elements to execute their functions.

Each of the constituent elements in each of the devices may be formed as separate chips, or may be formed as one chip so as to include the entire configuration or part of the configuration.

The terminology "system LSI circuit" depends on the degree of integration, and may also referred to as IC, LSI circuit, super LSI circuit, or ultra-LSI circuit. Moreover, the method of circuit integration is not limited to LSI. Integration may be realized with a specialized circuit or a general-purpose processor. After the LSI circuit is manufactured, a field programmable gate array (FPGA) or a reconfigurable processor capable of reconfiguring the connections and settings of the circuit cells in the LSI circuit may be used.

Further, if an integrated circuit technology that replaces LSI emerges from advances in or derivations of semiconductor technology, integration of functional blocks using such technology may also be used. Application of biotechnology is also a possibility.

(15) It should also be noted that a part or all of the constituent elements included in each of the above-described devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

(16) The present disclosure may be a computer program executed by a computer to perform the authentication method, or digital signals forming the computer program.

The present disclosure may be a computer-readable recording medium on which the computer program or the digital signals are recorded. Examples of the computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-ray(registered trademark) Disc), and a semiconductor memory. The present disclosure may be the digital signals recorded on the recording medium.

The present disclosure may be implemented by transmitting the computer program or the digital signals via an electric communication line, a wired or wireless communication line, a network represented by the Internet, data broadcasting, and the like.

The present disclosure may be a computer system including a microprocessor and a memory. The memory stores the computer program and the microprocessor operates according to the computer program.

The program or the digital signals may be recorded onto the recording medium to be transferred, or may be transmitted via a network or the like, so that the program or the digital signals can be executed by a different independent computer system.

(17) Embodiment above describes a case where the control network system is in-vehicle network system 10a. However, this is not intended to be limiting. The control network system that is a target of the intrusion path analysis performed by the intrusion path analysis device may be an on-premises network system or a network system built within factory or company premises. Alternatively, the control network system may be a mobile network system installed in a mobile object, such as a flight vehicle (an airplane or a drone, for instance) or an electric train.

(18) It should be noted that dividing of functional blocks in each of the schematic diagrams is an example. It is possible to implement a plurality of functional blocks as a single functional block, divide a single functional blocks into a plurality of functional blocks, or perform a part of a functional block by another functional block. It is also possible that similar functions of a plurality of functional block are processed by a single hardware or software in parallel or in time division.

(19) It should be noted that the order of performing a plurality of processes described in any of the above embodiments is an example. The order of performing a plurality of processes may be changed, or the plurality of processes may be performed in parallel. A part of the plurality of processes may not be performed.

(20) Each of security sensor 1004 etc. according to Embodiment above is implemented by a corresponding one of: a network intrusion detection system that detects an indication of an intrusion on the basis of network traffic; a host intrusion detection system that detects an indication of an intrusion on the basis of anomalous operation of at least one ECU 104 etc.; an anomalous packet detection system of a firewall included in in-vehicle network system 10a; a sensor that detects a login failure; a sensor that detects a signature verification failure; a sensor that detects a verification failure of a message authentication code included in a message transmitted on the network; and a sensor that detects a security access failure. However, this is not intended to be limiting.

(21) The present disclosure may be any combination of the above-described embodiments and variations.

INDUSTRIAL APPLICABILITY

According to the present disclosure, analysis of security alerts transmitted from a plurality of security sensors included in an in-vehicle network determines an intrusion path of an attacker. Thus, the present disclosure is effective in grasping a situation of an attack made on an in-vehicle network system.

The invention claimed is:

1. An intrusion path analysis device that is communicably connected to a control network system via a network,
the control network system being connected to at least one electronic control unit and a communication device,
the control network system including at least one security sensor,
the at least one security sensor transmitting a security alert indicating that an indication of a security breach is detected to the network, if the indication of the security breach is detected in at least one of the network, the at least one electronic control unit, or the communication device,
the intrusion path analysis device comprising:
a processor; and
a memory including at least one set of instructions that, when executed by the processor,
causes the processor to perform operations including:
obtaining the security alert from the at least one security sensor;
obtaining an event history of an event that occurs in the control network system; and
performing an analysis on an intrusion path of an attack on the basis of the security alert, the event history, and an intrusion depth indicating an intrusion level to be assumed in a case the security alert occurs, and that outputs a result of the analysis.

2. The intrusion path analysis device according to claim 1, wherein the control network system includes at least two subnetworks,
the communication device is included in at least one of the at least two subnetworks and communicates with one of a network located outside the control network system and a device, and
the intrusion depth is set according to at least one of a total physical number of intermediate points or a total logical number of intermediate points between the communication device and a monitoring target of the at least one security sensor, the intermediate points including at least one among the at least one electronic control unit, the at least two subnetworks, and a gateway device that connects the at least two subnetworks.

3. The intrusion path analysis device according to claim 1, wherein if the security alert includes a plurality of security alerts, the intrusion path analysis device performs the analysis by determining whether the event is caused by the attack on the basis of a temporal change in intrusion depths of the plurality of security alerts and the event that occurs while the plurality of security alerts are detected.

4. The intrusion path analysis device according to claim 1, wherein the intrusion path analysis device performs the analysis by determining that the event is caused by the attack if an occurrence distribution of the intrusion depth changes around an occurrence time of the event included in the event history.

5. The intrusion path analysis device according to claim 1, wherein the intrusion path analysis device performs the analysis by determining that an intrusion situation is spreading if the intrusion depth of the security alert increases over time, by determining that the intrusion situation is caused by the attack from an anomalous device if the intrusion depth of the security alert decreases over time, and by determining that the intrusion situation remains same if the intrusion depth of the security alert does not change over time.

6. The intrusion path analysis device according to claim 5, wherein the intrusion path analysis device performs the analysis by determining that an entry point of the attack is an area corresponding to a smallest depth if the intrusion situation is spreading, by determining that the entry point of the attack is an area corresponding to a greatest depth if the intrusion situation is caused by the attack from the anomalous device, and by determining that the entry point of the attack is an area corresponding to a constant depth if the intrusion situation remains the same.

7. The intrusion path analysis device according to claim 1, wherein if the security alert is only one and the intrusion depth of the security alert is greater than a predetermined threshold value, the intrusion path analysis device performs the analysis by determining that the security alert is caused by one of false detection and an intrusion by physical access.

8. The intrusion path analysis device according to claim 7, wherein if the event relates to the security alert, the intrusion path analysis device performs the analysis by determining that the event is caused by the attack.

9. The intrusion path analysis device according to claim 1, wherein, depending on the intrusion depth of the security alert, the intrusion path analysis device executes at least one of: strengthening of a function of monitoring at least one of the at least one electronic control unit or the communication device; or restriction on a function of at least one of the at least one electronic control unit or the communication device.

10. The intrusion path analysis device according to claim 9, wherein if it is determined that the intrusion situation is spreading and that the greatest depth among depths of the plurality of security alerts detected is greater than or equal to the predetermined threshold value, the intrusion path analysis device outputs a notification for partially disabling a function of the control network system.

11. The intrusion path analysis device according to claim 1, wherein the result of the analysis includes at least one of the entry point of the attack, the intrusion depth of the attack, or history information including the event history and the security alert that comprises at least one security alert.

12. The intrusion path analysis device according to claim 1, wherein the event includes at least one of: a login to a device included in the control network system; completion of installation or update of an application or firmware that is included or to be installed in the device; completion of transfer of the firmware; a system diagnosis; or transmission of a failure code.

13. The intrusion path analysis device according to claim 1, wherein the at least one security sensor includes at least one of: a sensor that detects an indication of an intrusion on the basis of network traffic; a sensor that detects an indication of an intrusion on the basis of anomalous operation of the at least one electronic control unit; a firewall included in the control network system that detects an anomalous packet; a sensor that detects a login failure; a sensor that detects a signature verification failure; a sensor that detects a verification failure of a message authentication code included in a message transmitted on the network; or a sensor that detects a security access failure.

14. The intrusion path analysis device according to claim 1, wherein the control network system is an in-vehicle network system.

15. An intrusion path analysis method used by a control network system via a network,
the control network system being connected to at least one electronic control unit and a communication device,
the control network system including at least one security sensor,
the at least one security sensor transmitting a security alert indicating that an indication of a security breach is detected to the network, if the indication of the security breach is detected in at least one of the network, the at least one electronic control unit, or the communication device,
the intrusion path analysis method comprising:
obtaining the security alert from the at least one security sensor;
obtaining an event history of an event that occurs in the control network system; and
performing an analysis on an intrusion path of an attack on the basis of the security alert, the event history, and an intrusion depth indicating an intrusion level to be assumed in a case the security alert occurs, and outputting a result of the analysis.

\* \* \* \* \*